(12) United States Patent
Nomura et al.

(10) Patent No.: US 8,120,693 B2
(45) Date of Patent: Feb. 21, 2012

(54) IMAGING UNIT AND MOBILE ELECTRONIC DEVICE

(75) Inventors: Hiroshi Nomura, Saitama (JP); Isao Okuda, Saitama (JP); Eijiroh Tada, Saitama (JP); Atsumi Kaneko, Saitama (JP)

(73) Assignee: Hoya Corporation, Tokyo (JP)

( * ) Notice: Subject to any disclaimer, the term of this patent is extended or adjusted under 35 U.S.C. 154(b) by 508 days.

(21) Appl. No.: 12/036,459

(22) Filed: Feb. 25, 2008

(65) Prior Publication Data
US 2008/0291543 A1 Nov. 27, 2008

(30) Foreign Application Priority Data

Feb. 26, 2007 (JP) .................................. 2007-45821
Feb. 21, 2008 (JP) .................................. 2008-39524

(51) Int. Cl.
*G02B 13/16* (2006.01)
*H04N 5/225* (2006.01)
(52) U.S. Cl. .......................... 348/335; 348/374; 359/372
(58) Field of Classification Search .................. 348/335, 348/337, 340, 344, 373, 374
See application file for complete search history.

(56) References Cited

U.S. PATENT DOCUMENTS

| | | | | |
|---|---|---|---|---|
| 4,249,798 A | * | 2/1981 | Moskovich | 359/683 |
| 6,829,011 B1 | * | 12/2004 | Higuchi et al. | 348/340 |
| 6,850,279 B1 | * | 2/2005 | Scherling | 348/335 |
| 7,085,073 B1 | * | 8/2006 | Han et al. | 359/698 |
| 7,170,558 B2 | * | 1/2007 | Yokota et al. | 348/337 |
| 7,646,418 B2 | * | 1/2010 | Nanjo | 348/335 |
| 7,813,052 B2 | * | 10/2010 | Eguchi et al. | 359/694 |
| 7,848,638 B2 | * | 12/2010 | Senba | 396/535 |
| 2002/0041445 A1 | | 4/2002 | Nishioka et al. | |
| 2002/0159158 A1 | | 10/2002 | Nagata | |
| 2003/0076436 A1 | | 4/2003 | Otake et al. | |
| 2004/0070843 A1 | | 4/2004 | Nishioka et al. | |
| 2004/0109076 A1 | * | 6/2004 | Yokota et al. | 348/335 |
| 2004/0189854 A1 | | 9/2004 | Tsukamoto et al. | |
| 2005/0134977 A1 | * | 6/2005 | Fukuda et al. | 359/835 |
| 2005/0190456 A1 | | 9/2005 | Nishioka et al. | |

(Continued)

FOREIGN PATENT DOCUMENTS

CN 1629674 6/2005

(Continued)

OTHER PUBLICATIONS

English language Abstract of JP 2007-17698, Jan. 25, 2007.

(Continued)

*Primary Examiner* — Hung Lam
(74) *Attorney, Agent, or Firm* — Greenblum & Bernstein, P.L.C.

(57) ABSTRACT

An imaging unit including an image sensor, an incident-side prism, an exit-side prism, and an intermediate optical system positioned therebetween, wherein light incident on the incident-side prism passes through the incident-side prism, the intermediate optical system and the exit-side prism to be incident on the image sensor, the imaging unit includes a housing supporting the incident-side prism, the exit-side prism and the intermediate optical system such that incident and exit optical axes of the incident-side prism, an optical axis of the intermediate optical system, and incident and exit optical axes of the exit-side prism all lie on a common plane; and a cover board, on which the image sensor is mounted, fixed to the housing so that the image sensor faces an exit surface of the exit-side prism, the cover board closing an opening of the housing.

6 Claims, 14 Drawing Sheets

U.S. PATENT DOCUMENTS

| | | |
|---|---|---|
| 2005/0253951 A1 | 11/2005 | Fujimoto et al. |
| 2005/0264675 A1 | 12/2005 | Enomoto |
| 2006/0017834 A1* | 1/2006 | Konno et al. ............ 348/335 |
| 2006/0092524 A1 | 5/2006 | Konno |
| 2006/0170388 A1 | 8/2006 | Nomura et al. |
| 2006/0284988 A1 | 12/2006 | Wakui |
| 2008/0106631 A1 | 5/2008 | Sugawara et al. |

FOREIGN PATENT DOCUMENTS

| | | |
|---|---|---|
| EP | 1197767 | 4/2002 |
| EP | 1906654 | 4/2008 |
| JP | 11-17996 | 1/1999 |
| JP | 2002-189172 | 7/2002 |
| JP | 2003-43354 A | 2/2003 |
| JP | 2004-247887 | 9/2004 |
| JP | 2004-247887 A | 9/2004 |
| JP | 2004-301938 | 10/2004 |
| JP | 2004-355010 | 12/2004 |
| JP | 2005-221896 A | 8/2005 |
| JP | 2005-266587 A | 9/2005 |
| JP | 2005-274612 | 10/2005 |
| JP | 2005-352287 | 12/2005 |
| JP | 2006-154373 A | 6/2006 |
| JP | 2006-154705 | 6/2006 |
| JP | 2006-154705 A | 6/2006 |
| JP | 2006-317547 | 11/2006 |
| JP | 2007-17698 | 1/2007 |
| JP | 2007-108237 A | 4/2007 |

OTHER PUBLICATIONS

English language Abstract of JP 2005-274612, Oct. 6, 2005.
English language Abstract of JP 2006-317547, Nov. 24, 2006.
English language Abstract of JP 2004-247887, Sep. 2, 2004.
English language Abstract of JP 2005-352287, Dec. 22, 2005.
China Office action, dated Sep. 27, 2010 along with an english translation thereof.
English language Abstract of JP 2006-154705, (Jun. 15, 2006).
English language Abstract of JP 11-17996, (Jan. 22, 1999).
English language Abstract of JP 2004-301938, (Oct. 28, 2004).
English language Abstract of JP 2002-189172, (Jul. 5, 2002).

* cited by examiner

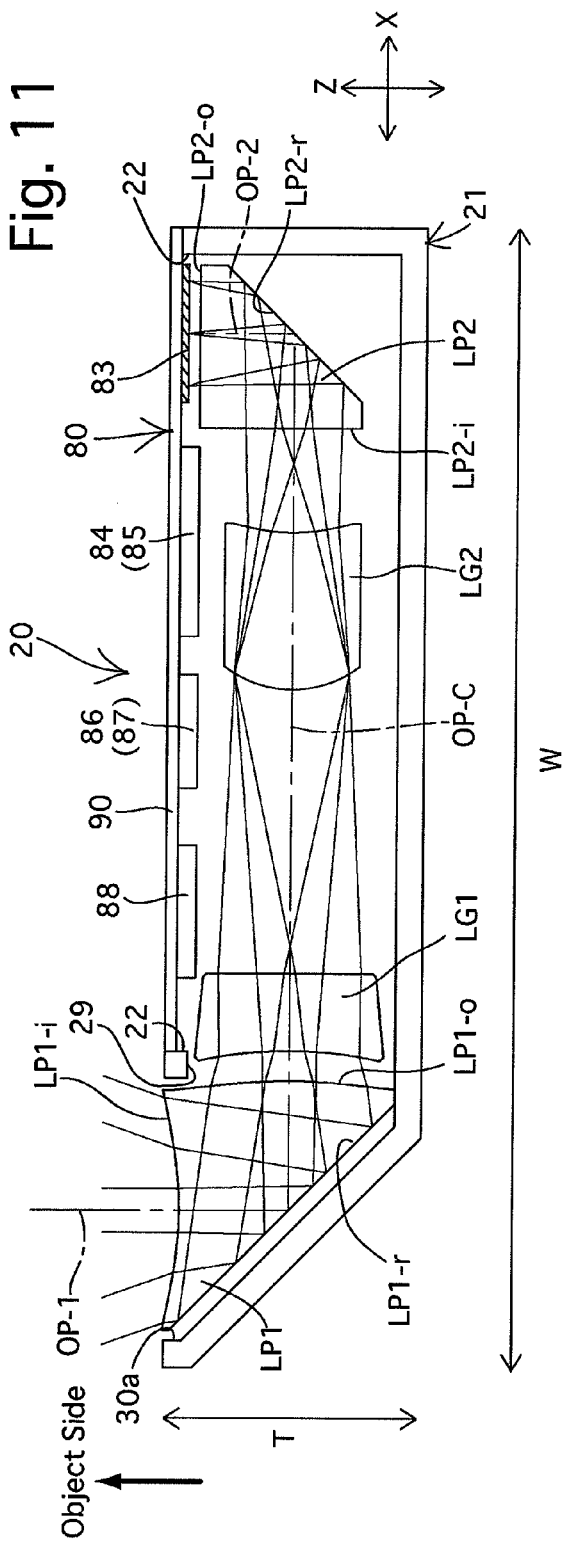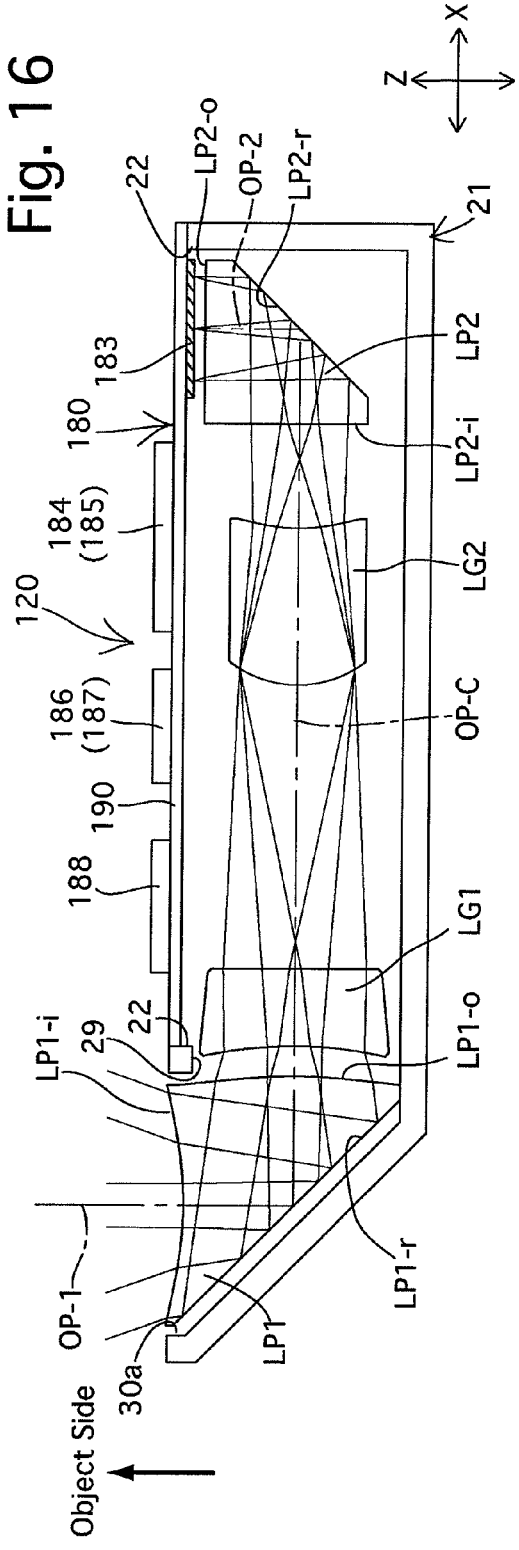

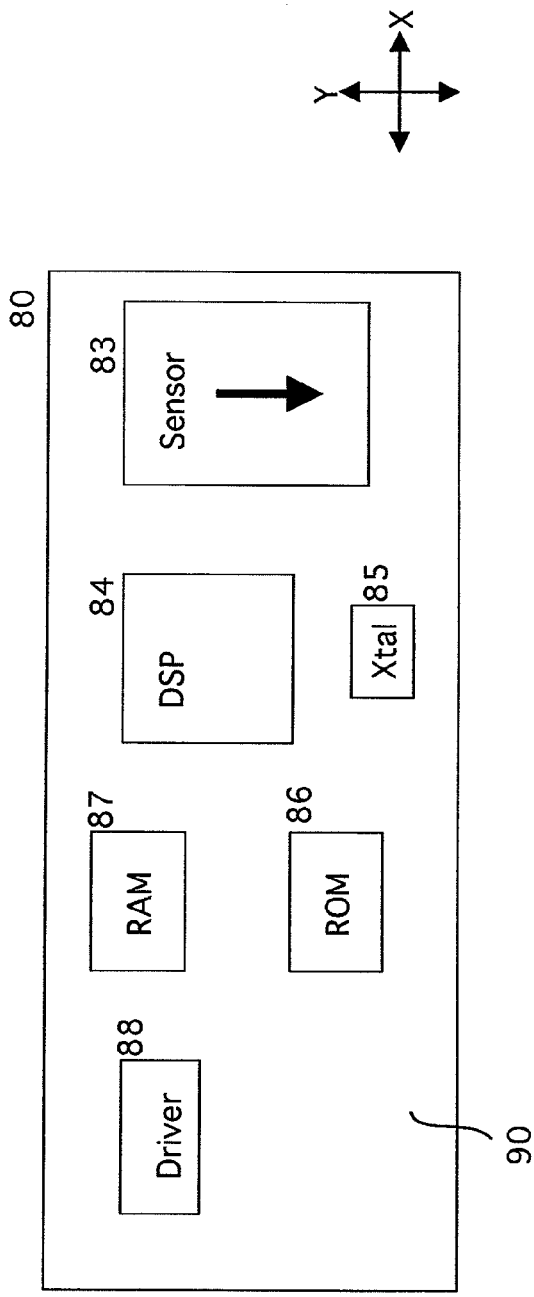

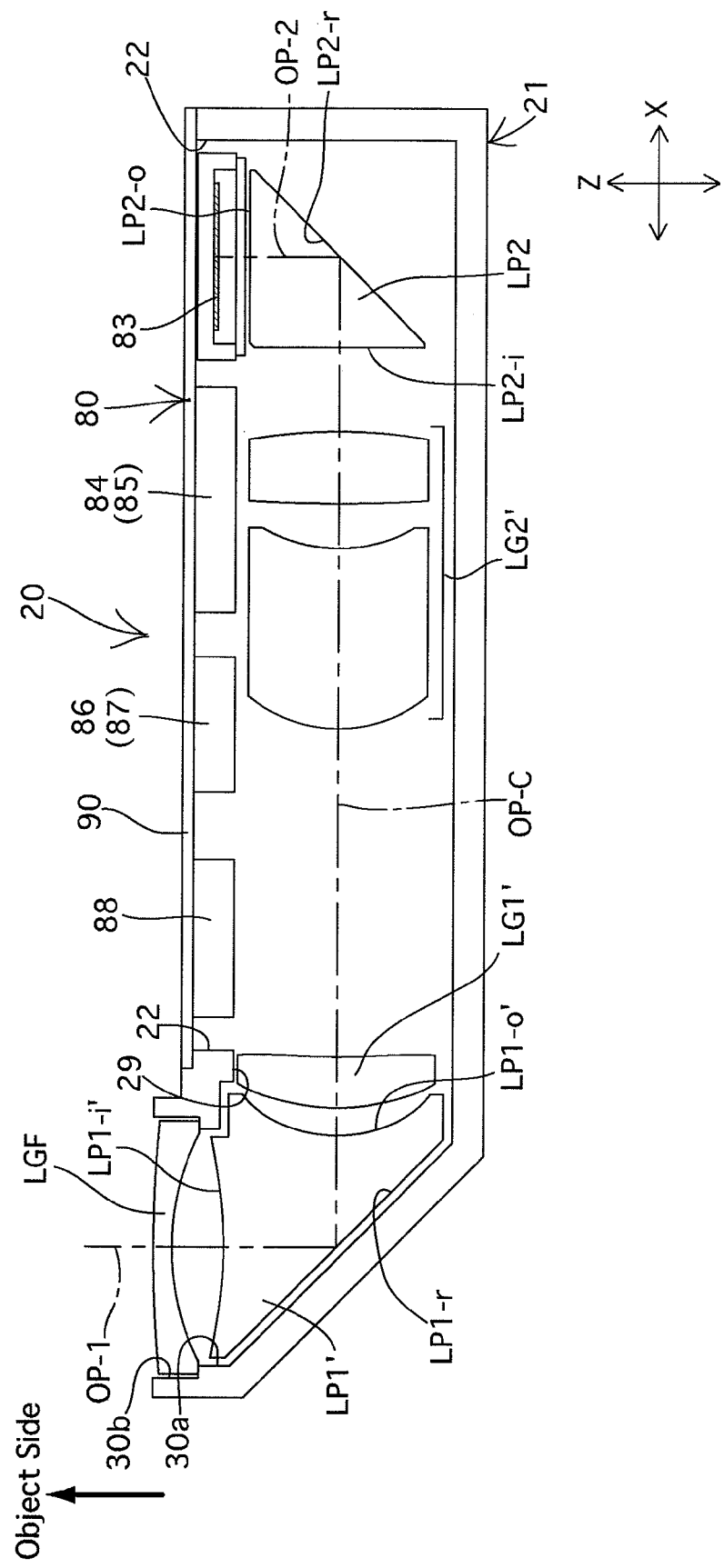

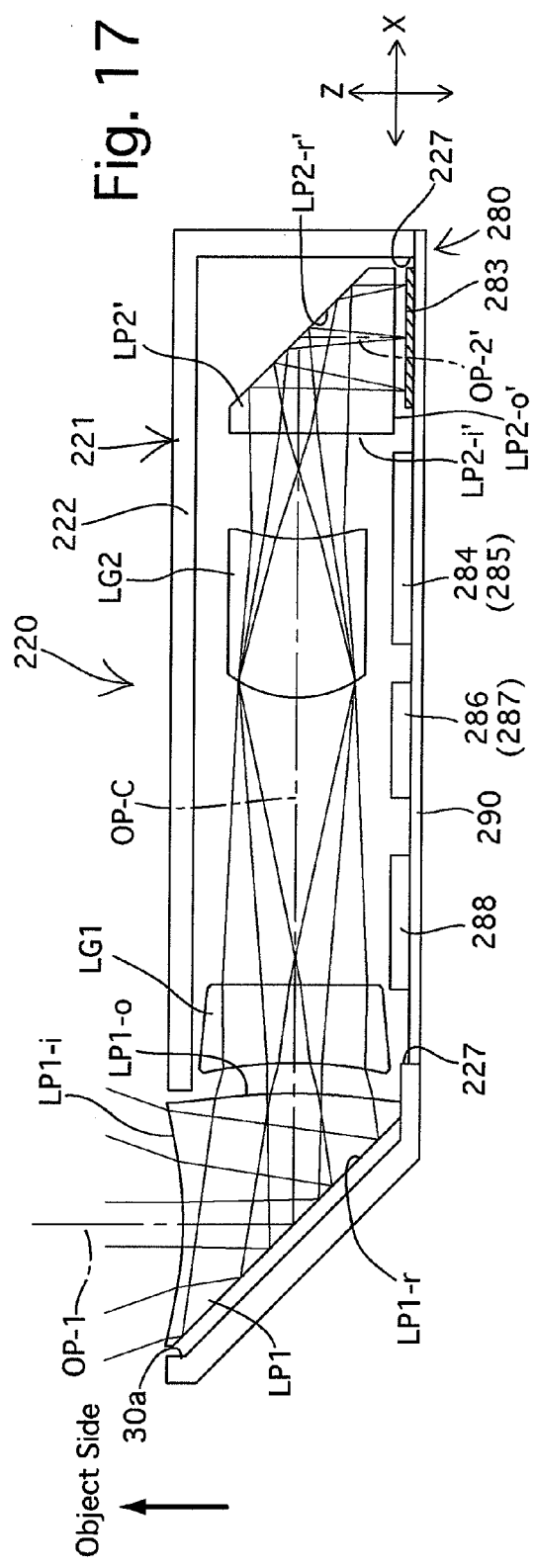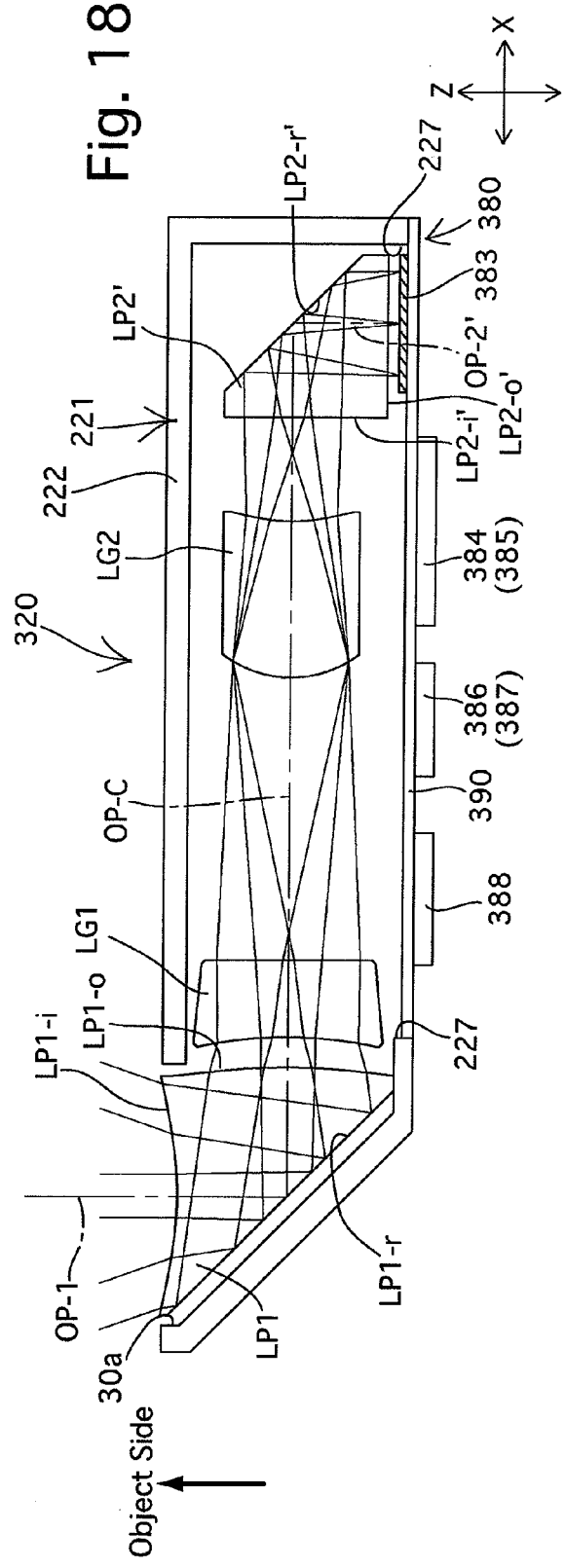

IMAGING UNIT AND MOBILE ELECTRONIC DEVICE

BACKGROUND OF THE INVENTION

1. Field of the Invention

The present invention relates to an imaging unit which includes an imaging optical system and an image sensor. The present invention also relates to a mobile electronic device which includes the imaging unit.

2. Description of the Related Art

In recent years, various mobile electronic devices which are designed either for taking still/moving images or to have the capability of taking such images as a subsidiary function, such as digital cameras (still-video cameras), digital camcorders (motion-video cameras), mobile phones with a camera, and personal digital assistants (PDAs), have become widespread, and it has been desired to slim down the on-board imaging device as part of improvements in portability of such mobile electronic devices. For instance, a type of imaging optical system in which an optical path is bent to slim down the imaging optical system by the use of two prisms which are installed on the incident side (that faces the subject (object)) and the exit side (that faces an image sensor), respectively, has been proposed. This type of imaging optical system is disclosed in Japanese unexamined patent publication 2006-154705.

This patent publication has merely proposed such a slimmed-down type of imaging optical system, thus not showing any specific structure of an imaging device which is designed to be installed in an electronic device.

SUMMARY OF THE INVENTION

The present invention provides an imaging unit having a structure desirable for installation of such a slimmed-down type of imaging optical system in a mobile electronic device. In particular, the present invention provides an imaging unit having compact design which is easy to handle during manufacturing and maintenance. The present invention further provides a mobile electronic device in which such an imaging unit is installed in a space-saving manner.

According to an aspect of the present invention, an imaging unit is provided, including an image sensor, an incident-side prism, an exit-side prism, and an intermediate optical system positioned between the incident-side prism and the exit-side prism, wherein light incident on the incident-side prism passes through the incident-side prism, the intermediate optical system and the exit-side prism in that order to be incident on the image sensor, the imaging unit including a housing which supports the incident-side prism, the exit-side prism and the intermediate optical system in a manner such that an incident optical axis and an exit optical axis of the incident-side prism, an optical axis of the intermediate optical system, and an incident optical axis and an exit optical axis of the exit-side prism all lie on a common plane; and a cover board, on which the image sensor is mounted, fixed to the housing so that the image sensor faces an exit surface of the exit-side prism, the cover board serving as a cover for closing (covering) an opening of the housing.

It is desirable for a mounting surface of the cover board, on which the image sensor is mounted, and the optical axis of the intermediate optical system to be substantially parallel to each other.

It is desirable for the cover board to include an image processor which operates to create an image signal capable of being visually indicated by a display device in accordance with a signal output from the image sensor.

It is desirable for the intermediate optical system to include at least one movable lens group movable along the optical axis of the intermediate optical system.

It is desirable for the imaging unit to include at least one actuator, positioned in the housing, for moving the movable lens group along the optical axis of the intermediate optical system.

It is desirable for the movable lens group to be a zoom optical system which changes a focal length of an imaging optical system including the incident-side prism, the intermediate optical system and the exit-side prism by movement of the movable lens group.

It is desirable for the movable lens group to be a focusing lens group which is moved to perform a focusing operation.

It is desirable for the incident optical axis of the incident-side prism, the optical axis of the intermediate optical system and the exit optical axis of the exit-side prism to form a single optical axis bent in a substantially U-shape.

It is desirable for a combination of the housing and the cover board fixed to the housing to have an incident opening which is formed at a corresponding position to an incident surface of the incident-side prism, the incident opening being a sole optical opening of the imaging unit.

It is desirable for the imaging unit to be incorporated in a mobile electronic device. A flexible printed circuit board for signal transmission which extends from the imaging unit is connected to a control circuit provided in the mobile electronic device, to thereby include an imaging system of the mobile electronic device.

It is desirable for an incident surface and the exit surface of the incident-side prism to include a concave surface and a convex surface, respectively.

It is desirable for each of an incident surface and the exit surface of the incident-side prism to include a concave surface.

It is desirable for the imaging unit to include a front lens group positioned on an object side of the incident-side prism.

It is desirable for the cover board to includes various chips in addition to the image sensor.

It is desirable for each of the incident-side prism and the exit-side prism to include a right-angle prism.

It is desirable for the actuator to be a motor having a drive shaft, and for the motor to be positioned in the housing so that the drive shaft extends in a direction substantially parallel to the optical axis of the intermediate optical system.

In an embodiment, an imaging unit is provided, including an image sensor; an incident-side element including an incident-side prism; an exit-side prism; and an intermediate optical system positioned between the incident-side prism and the exit-side prism, light incident on the incident-side prism passing through the incident-side prism, the intermediate optical system and the exit-side prism in that order to be incident on the image sensor. An incident optical axis of the incident-side prism and an exit optical axis of the exit-side prism are substantially parallel to each other. An optical axis of the intermediate optical system is substantially orthogonal to each of the incident optical axis of the incident-side prism and the exit optical axis of the exit-side prism. The incident optical axis of the incident-side prism, the optical axis of the intermediate optical system, and the exit optical axis of the exit-side prism all lie on a common plane. At least a part of the incident-side optical element positioned on the incident optical axis projects toward an object side by a greater amount than the intermediate optical system and the exit-side prism in the same plane. The imaging unit includes a sensor board, on which the image sensor is mounted, positioned on the exit optical axis of the exit-side prism, the sensor board substantially lying on an extension of the projected portion of the incident-side optical element in a direction parallel to the optical axis of the intermediate optical system.

It is desirable for the incident surface and an exit surface of the incident-side prism to include a concave surface and a convex surface, respectively.

It is desirable for each of the incident surface and an exit surface of the incident-side prism to include a concave surface.

It is desirable for the incident-side optical element to include a front lens group positioned on an object side of the incident-side prism.

In an embodiment, an imaging unit is provided, including an imaging optical system having an incident optical axis, an intermediate optical axis and an exit optical axis which all lie on a common plane, the incident optical axis and the exit optical axis being parallel to each other, and the intermediate optical axis being positioned between the incident optical axis and the exit optical axis to be substantially orthogonal to both the incident optical axis and the exit optical axis; a housing which supports the imaging optical system, the housing having a first opening through which at least the incident optical axis passes and a second opening through which at least the exit optical axis passes; and a cover board which includes an image sensor positioned on the exit optical axis and serves as a cover for closing the second opening of the housing.

It is desirable for the second opening to extend along an area on a plane parallel with the intermediate optical axis, the cover board covering the area along the intermediate optical axis.

In an embodiment, a mobile electronic device is provided, including a foldable housing including a hinge portion and two portions joined by the hinge portion to be changeable between an unfolded state and a folded state by relative rotational movement of the two portions via the hinge portion; and an imaging unit installed in one of the two portions of the foldable housing. The imaging unit includes an image sensor, an incident-side prism, an exit-side prism, and an intermediate optical system positioned between the incident-side prism and the exit-side prism, light incident on the incident-side prism passing through the incident-side prism, the intermediate optical system and the exit-side prism in that order to be incident on the image sensor. An incident optical axis of the incident-side prism and an exit optical axis of the exit-side prism are substantially parallel to each other. An optical axis of the intermediate optical system is substantially orthogonal to each of the incident optical axis of the incident-side prism and the exit optical axis of the exit-side prism. The incident optical axis of the incident-side prism, the optical axis of the intermediate optical system, and the exit optical axis of the exit-side prism all line on a common plane. The imaging unit is installed in the one of the two portions of the foldable housing so that the optical axis of the intermediate optical system and an axis of rotation of the hinge portion are substantially parallel to each other.

It is desirable for the imaging unit to be positioned between the hinge portion and a display device which is installed in the one of the two portions of the foldable housing.

According to the present invention, an imaging unit which is compact in size, easy to handle and suitable for being installed in an electronic device is achieved.

The present disclosure relates to subject matter contained in Japanese Patent Applications Nos. 2007-45821 (filed on Feb. 26, 2007) and 2008-39524 (filed on Feb. 21, 2008) which are expressly incorporated herein by reference in their entireties.

BRIEF DESCRIPTION OF THE DRAWINGS

The present invention will be described below in detail with reference to the accompanying drawings in which:

FIG. 11 is a cross sectional view taken along XI-XI line shown in FIG. 6;

FIG. 12 is a simplified front view of the cover board of the housing, showing the layout of the electronic circuit parts contained on the cover board;

FIG. 15 is a cross sectional view of another embodiment of the imaging unit in which a front (extra) lens group is provided in front of the first prism of the imaging optical system shown in FIG. 14;

FIG. 16 is a cross sectional view of another embodiment of the imaging unit in which the electronic circuit parts on the cover board except the image sensor are mounted to the outer surface of the cover board, in contrast to the electronic circuit parts shown in FIG. 11;

FIG. 17 is a cross sectional view of another embodiment of the imaging unit in which the cover board is fixed to the back side of the housing with the direction of reflection of the second prism being inverted so that the second prism reflects the incident light in the direction opposite to the direction of reflection of the second prism shown in FIG. 11; and FIG. 18 is a cross sectional view of another embodiment of the imaging unit in which the electronic circuit parts on the cover board except the image sensor are mounted to the outer surface of the cover board, in contrast to the electronic circuit parts shown in FIG. 17.

DESCRIPTION OF THE PREFERRED EMBODIMENTS

Figure 1:
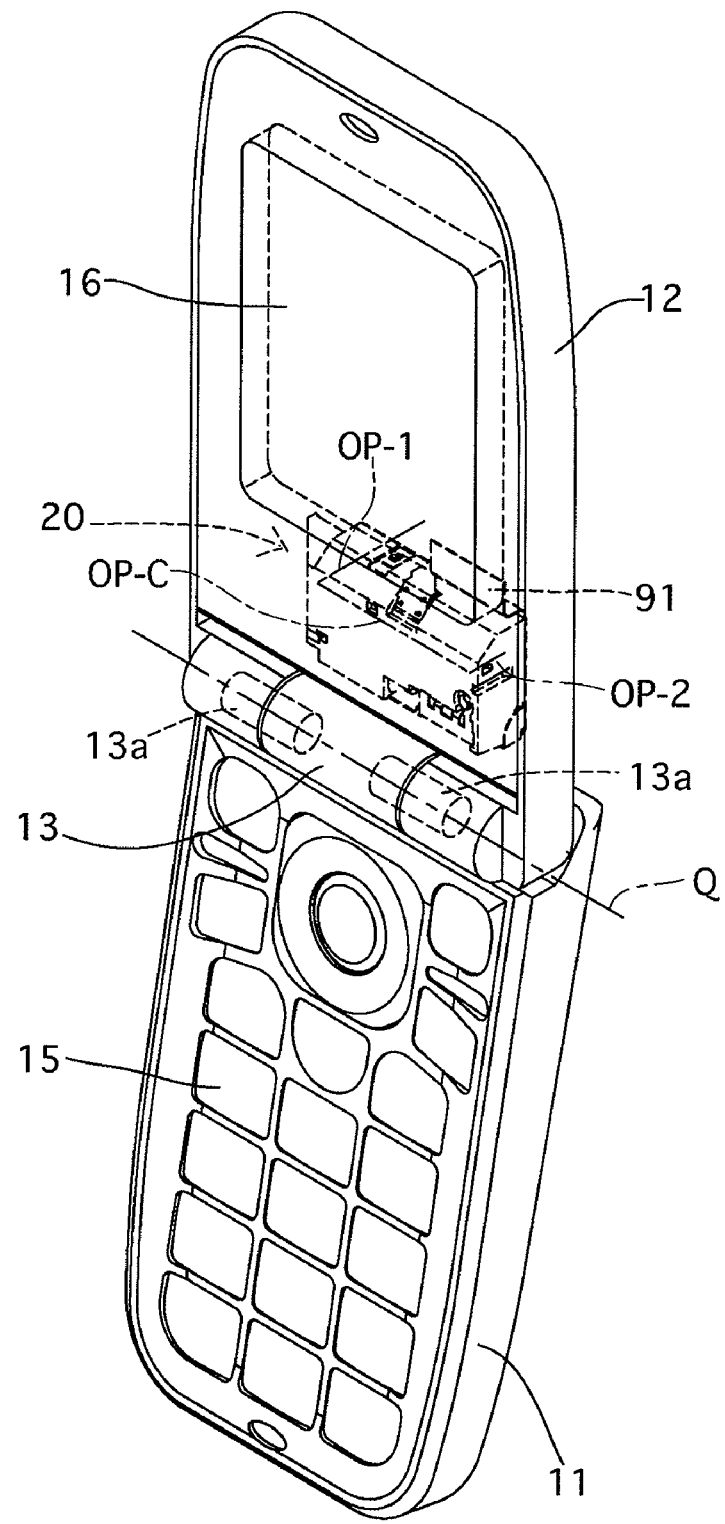
FIG. 1 is a perspective view of a folding type of mobile phone in which an imaging unit according to the present invention is incorporated, showing a fully open state (unfolded state) of the mobile phone.
Figure 2:
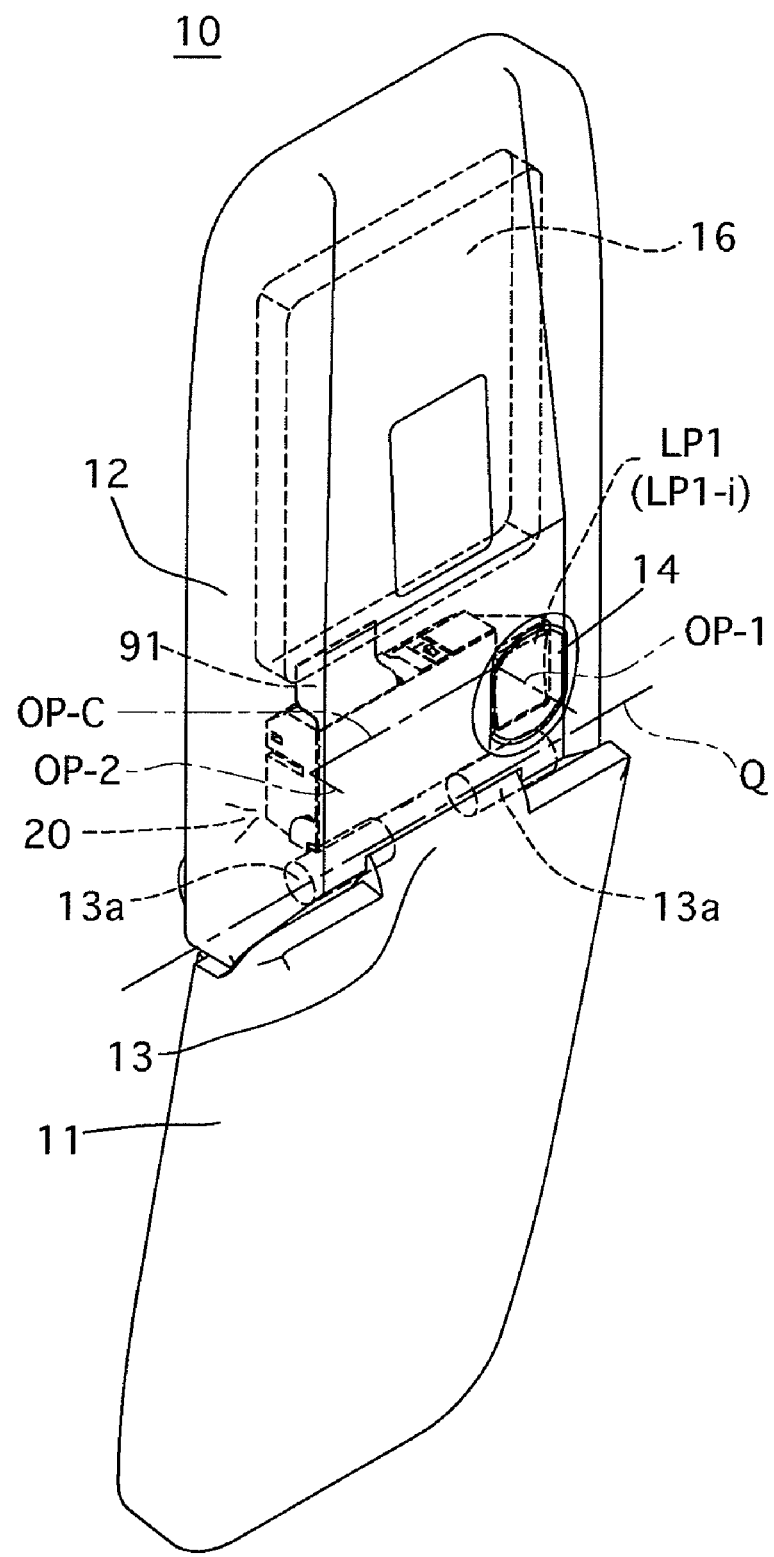
FIG. 2 is a perspective view of the mobile phone shown in FIG. 1, viewed from the other side of the mobile phone shown in FIG. 1.
Figure 3:
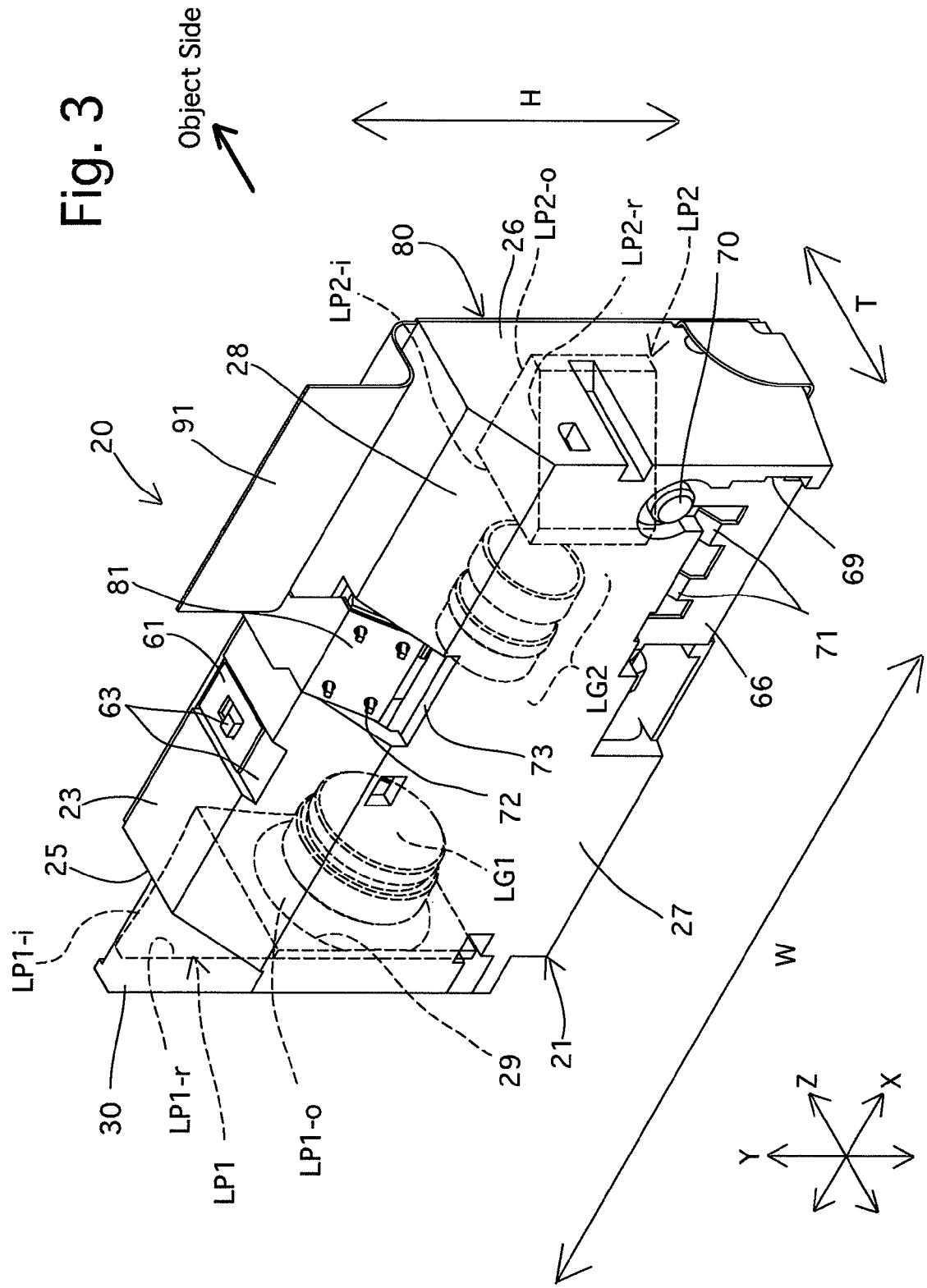
FIG. 3 is a perspective view of the imaging unit, showing the outward appearance thereof, and further showing the interior of the imaging unit to show an imaging optical system included in the imaging unit by dashed lines.
Figure 4:
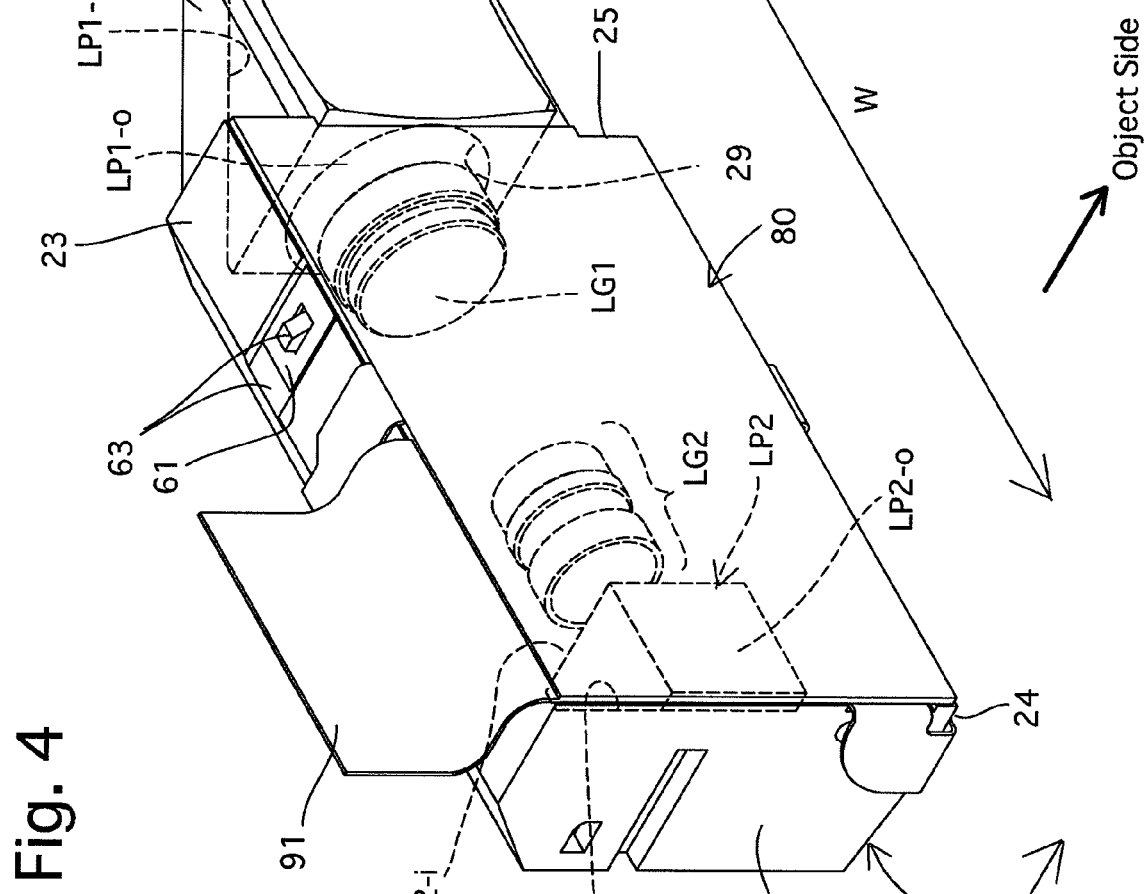
FIG. 4 is a perspective view of the imaging unit, viewed from the other side (front side) of the imaging unit (from the object side) shown in FIG. 3.

A mobile phone (cellular phone) 10 shown in FIGS. 1 and 2 is a folding type which is provided with a foldable housing including an operational portion 11 and a display portion 12, and is further provided between the operational portion 11 and the display portion 12 with a hinge portion 13. The operational portion 11 and the display portion 12 are hingedly connected with each other via the hinge portion 13 to be allowed to rotate relative to each other about an axis Q of a pair of coaxial hinge pins 13a of the hinged portion 13 so that the mobile phone 10 can change between an operating state (fully open state/unfolded state) shown in FIGS. 1 and 2, in which the operational portion 11 and the display portion 12 are fully opened, and a folded state (not shown) in which the mobile phone 10 is folded so that the operational portion 11 and the display portion 12 overlay each other. The operational portion 11 is provided with a plurality of operational keys 15 such as numerical keys and function keys, and the display portion 12 is provided with a liquid crystal display (LCD) 16 serving as a display device. The display portion 12 is provided, on the back thereof (outer surface of the display portion 12 that is exposed whether the mobile phone is a folded state or a fully open state) in the vicinity of the hinge portion 13, with a photographic aperture 14 (see FIG. 2). The mobile phone 10 is provided, behind the photographic aperture 14 with respect to FIG. 2, with an imaging unit (imaging module) 20.

The imaging unit 20 will be discussed in detail with reference to FIGS. 3 through 13. As shown in FIGS. 3 through 6 and 11, the imaging unit 20 is provided with a first prism (incident-side prism, incident-side optical element) LP1, a first lens group LG1 having negative refracting power, a second lens group LG2 having positive refracting power, and a second prism (exit-side prism) LP2, which constitute an imaging optical system, and the imaging unit 20 is constructed so that a housing 21 of the imaging unit 20 supports these four optical elements. The imaging optical system that is installed in the imaging unit 20 is a zoom optical system in which the focal length can be varied, and is constructed from the first lens group LG1 and the second lens group LG2 which are movable in the optical axis direction thereof.

The housing 21 is formed in a box-shaped body which is elongated in the horizontal direction to satisfy the following conditional expression: W>H>T, wherein W, H and T designate the width, the height and the thickness of the display portion 12 of the mobile phone 10, respectively (see FIGS. 3 and 4). In the following descriptions, the directions of the imaging unit 20 in the directions of the width W, the height H and the thickness T are referred to as X-direction, Y-direction and Z-direction, respectively. Although the upper, lower, left and right sides of the imaging unit 20 change according to the orientation of the mobile phone 10, in the following descriptions the vertical and horizontal directions of the imaging unit 20 are determined with reference to the imaging unit 20 shown in FIG. 6 for the purpose of illustration.

The front part of the housing 21, which faces toward the object side when a photograph is taken, is open to form a front opening 22. The housing 21 is provided on the upper and lower sides of the front opening 22 with an upper wall 23 and a lower wall 24, respectively, and is further provided on the right-hand side and the left-hand side of the front opening 22 with a right wall 25 and a left wall 26, respectively. The housing 21 is provided, on the opposite side thereof from the front opening 22 in the Z-direction, with a back wall 27 which closes the back of the housing 21. The upper wall 23 and the lower wall 24 are flat plates parallel to each other, each of includes X-directional components and Z-directional components. The right wall 25 and the left wall 26 are flat plates parallel to each other, each of which is composed of Y-directional components and Z-directional components. The back wall 27 is a flat panel which is composed of X-directional components and Y-directional components. The upper wall 23 and the back wall 27 are connected to each other via an oblique wall 28 (see FIGS. 3 and 5).

Figure 6:
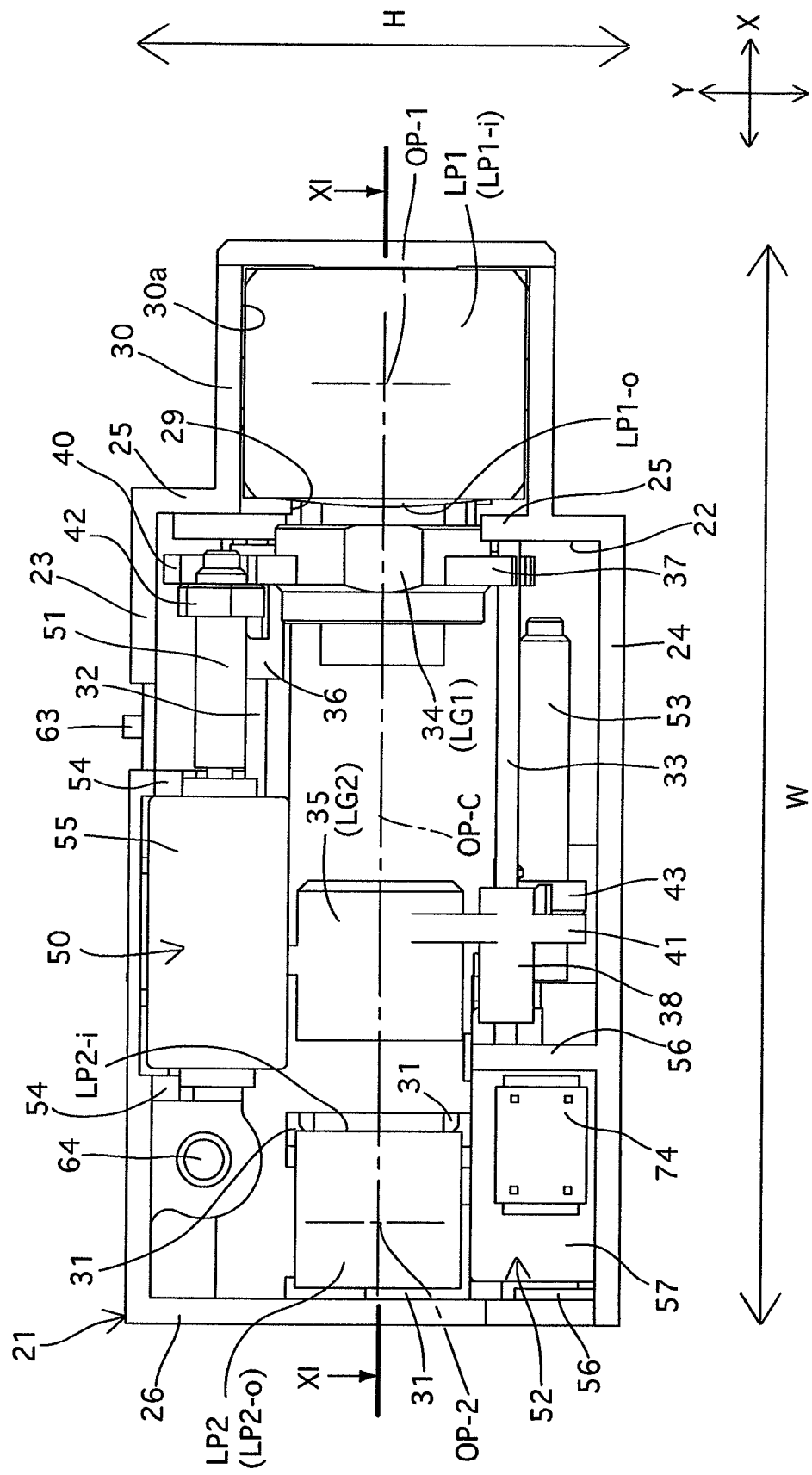
FIG. 6 is a front elevational view of the imaging unit with the cover board thereof being removed.
Figure 7:
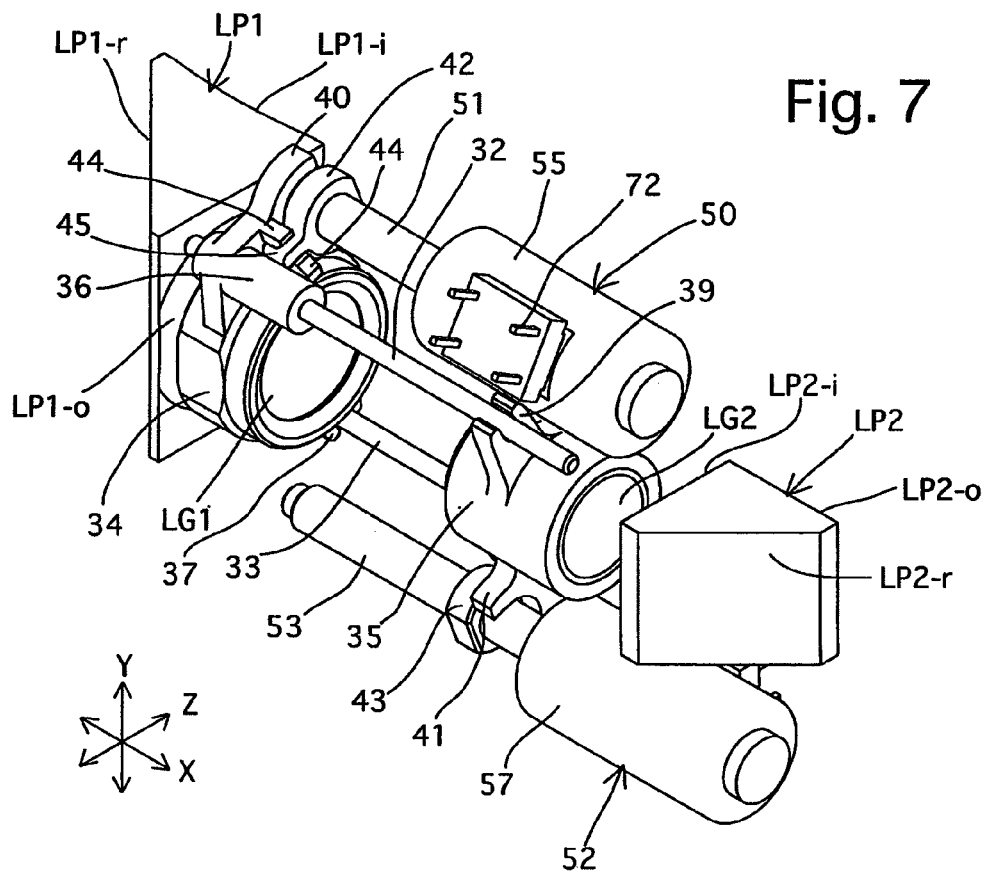
FIG. 7 is a perspective view of internal elements of the imaging unit which are housed in the housing of the imaging unit, wherein the internal elements include the imaging optical system, a support-and-guide mechanism for supporting the first lens group and the second lens group of the imaging optical system, and actuators (motors) for moving the first lens group and the second lens group.
Figure 8:
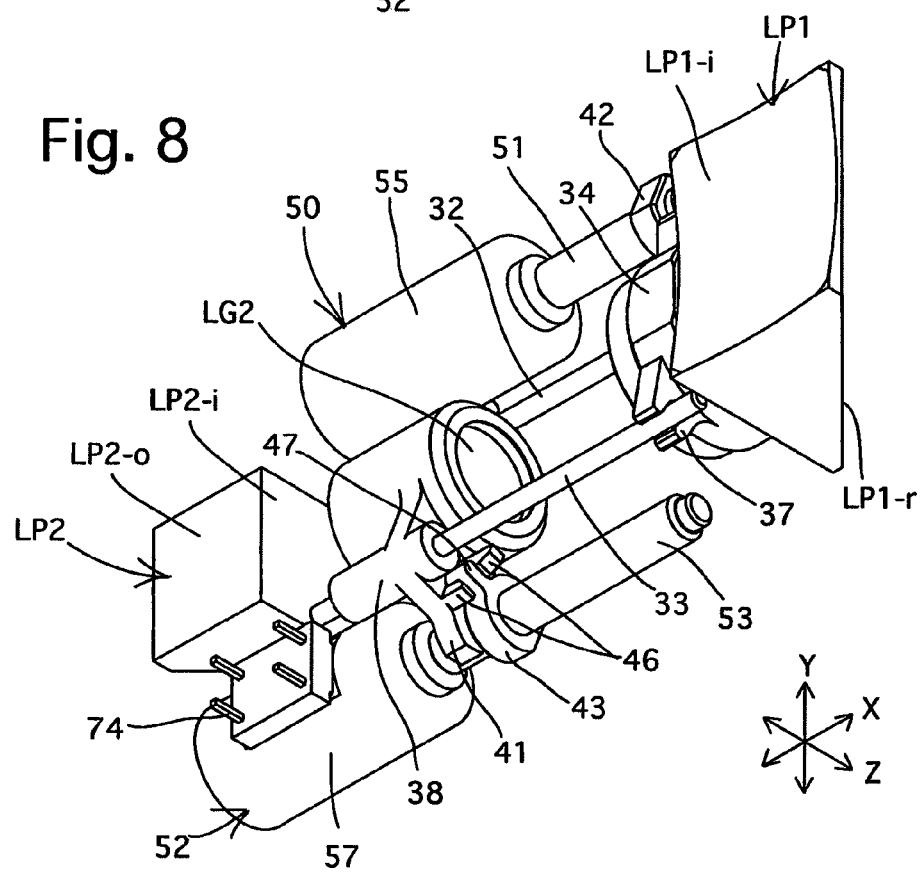
FIG. 8 is a perspective view of the internal elements shown in FIG. 7, viewed from the other side of the internal elements shown in FIG. 7.

The housing 21 is provided at one end and the other end thereof in the X-direction with a first-prism accommodation portion 30 and a second-prism accommodation portion 31 (see FIG. 6) which accommodate the first prism LP1 and the second prism LP2, respectively. As shown in FIG. 6, the second-prism accommodation portion 31 is formed as a partition wall positioned adjacent to the left wall 26 in the housing 21, whereas the first-prism accommodation portion 30 is formed as a box-shaped portion which projects sideways (rightward with respect to FIG. 6) from the right wall 25. The front of the first-prism accommodation portion 30, which faces toward the object side (toward the photographic aperture 14) when a photograph is taken, is provided with an incident opening 30a, similar to the front opening 22. Namely, the housing 21 is shaped so that almost the entire part of the front of the housing 21 that faces the back wall 27 is formed as an opening. A through hole 29 (see FIGS. 6 and 11) is formed in the right wall 25 of the housing 21 so that the internal space of the first-prism accommodation portion 30 and the internal space of the major part of the housing 21 are communicatively connected to each other in the X-direction via the through hole 29.

The first prism LP1 is aright-angle prism which is provided with an incident surface LP1-i, an exit surface LP1-o and a reflection surface LP1-r. The first prism LP1 reflects light incident from the incident surface LP1-i at a substantially right angle toward the exit surface LP1-o by the reflection surface LP1-r. The incident surface LP1-i is a concave surface and the exit surface LP1-o is a convex surface. The second prism LP2 is a right-angle prism which is provided with an incident surface LP2-i, an exit surface LP2-o, and a reflection surface LP2-r. The second prism LP2 reflects light incident on the incident surface LP2-i at a substantially right angle toward the exit surface LP2-o by the reflection surface LP2-r. In the first prism LP1 that is accommodated in the first-prism accommodation portion 30, the incident surface LP1-i is exposed to the object side through the incident opening 30a while the exit surface LP1-o is positioned to face the through hole 29, which is formed in the right wall 25 of the housing 21 to extend in the X-direction. In the second prism LP2 that is accommodated in the second-prism accommodation portion 31, the incident surface LP2-i is spaced away from the exit surface LP1-o of the first prism LP1 while the exit surface LP2-o is positioned to face the front opening 22. Namely, the first prism LP1 and the second prism LP2 are positioned so that both the incident surface LP1-i of the first prism LP1 and the exit surface LP2-o of the second prism LP2 face toward the object side.

The imaging unit 20 is provided in the housing 21 with a pair of guide bars 32 and 33 which extend parallel to each other in the X-direction. The guide bars 32 and 33 are disposed at different positions in the Y-direction. The guide bar 32 is positioned above the guide bar 33 to be closer to the upper wall 23 of the housing 21 than the guide bar 33 in the Y-direction and to be closer to the back wall 27 in the back of the housing 21 than the guide bar 33 in the Z-direction. The guide bar 33 is positioned below the guide bar 32 to be closer to the lower wall 24 than the guide bar 32 in the Y-direction and to be closer to the front opening 22 than the guide bar 32 in the Z-direction. The imaging unit 20 is provided in the housing 21 with a first lens group frame 34 and a second lens group frame 35 which support the first lens group LG1 and the second lens group LG2, respectively. The first lens group frame 34 and the second lens group frame 35 are supported by the guide bars 32 and 33 to be freely slidable thereon in the X-direction. The first lens group frame 34 is provided with a cylindrical guide portion 36 and a rotation limit arm 37 which project in substantially opposite radial directions away from each other. The cylindrical guide portion 36 is fitted on the guide bar 32 to be slidable thereon in the X-direction. The radially outer end of the rotation limit arm 37 is bifurcated to be engaged with the guide bar 33 to prevent the first lens group frame 34 from rotating about the guide bar 32. The second lens group frame 35 is provided with a cylindrical guide portion 38 and a rotation limit arm 39 which project in substantially opposite radial directions away from each other. The cylindrical guide portion 38 is fitted on the guide bar 33 to be slidable thereon in the X-direction. The radially outer end of the rotation limit arm 39 is bifurcated to be engaged with the guide bar 32 to prevent the second lens group frame 35 from rotating about the guide bar 33. Due to the engagement of the rotation limit arm 37 with the guide bar 33 and the engagement of the rotation limit arm 39 with the guide bar 32, the first lens group frame 34 and the second lens group frame 35 are supported by the guide bars 32 and 33 to be freely movable linearly in the X-direction. In a state where the first lens group frame 34 and the second lens group frame 35 are supported by the guide bars 32 and 33, the first lens group LG1 and the second lens group LG2 are positioned between the first prism LP1 and the second prism LP2 in the X-direction, while the first lens group LG1 and the second lens group LG2 face the exit surface LP1-$o$ of the first prism LP1 and the incident surface LP2-$i$ of the second prism LP2, respectively, as shown in FIGS. 3, 4, 6, 7, 8 and 11.

In a state where an imaging optical system is supported by the housing 21 therein as described above, light from the object side is incident on the incident surface LP-$i$ of the first prism LP1 along an incident optical axis OP-1 that extends in the Z-direction as shown in FIG. 11. The first prism LP1 reflects the incident light by the reflection surface LP1-$r$ at a substantially right angle, and the light thus reflected by the reflection surface LP1-$r$ travels through the first lens group LG1 and the second lens group LG2 along an intermediate optical axis OP-C that extends in the X-direction to be incident on the incident surface LP2-$i$ of the second prism LP2. The second prism LP2 reflects the incident light toward the object side by the reflection surface LP2-$r$ at a substantially right angle so that the light thus reflected by the reflection surface LP2-$r$ exits from the second prism LP2 through the exit surface LP2-$o$ along an exit optical axis OP-2 that extends in the Z-direction. Accordingly, the imaging optical system that is provided in the imaging unit 20 is configured as an optical system including the incident optical axis OP-1, the intermediate optical axis OP-C and the exit optical axis OP-2, which constitute a single optical axis bent in a substantially U-shape. The positions of the incident optical axis OP-1, the intermediate optical axis OP-C and the exit optical axis OP-2 in the Y-direction are mutually identical, so that the incident optical axis OP-1, the intermediate optical axis OP-C and the exit optical axis OP-2 all lie in a common plane. The exit optical axis of the first prism LP1 and the incident optical axis of the second prism LP2 are coincident with the intermediate optical axis OP-C.

Figure 9:
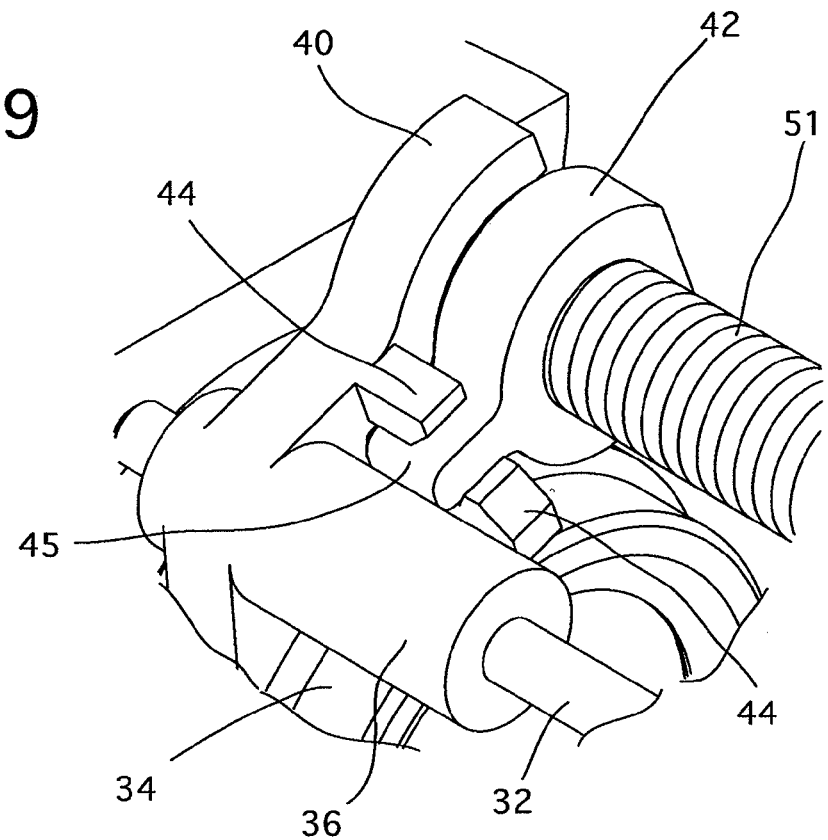
FIG. 9 is an enlarged perspective view of a part of the internal elements shown in FIG. 7 in the vicinity of an engaged portion between the nut-engaging portion of the first lens group frame and the nut on the first motor side.
Figure 10:
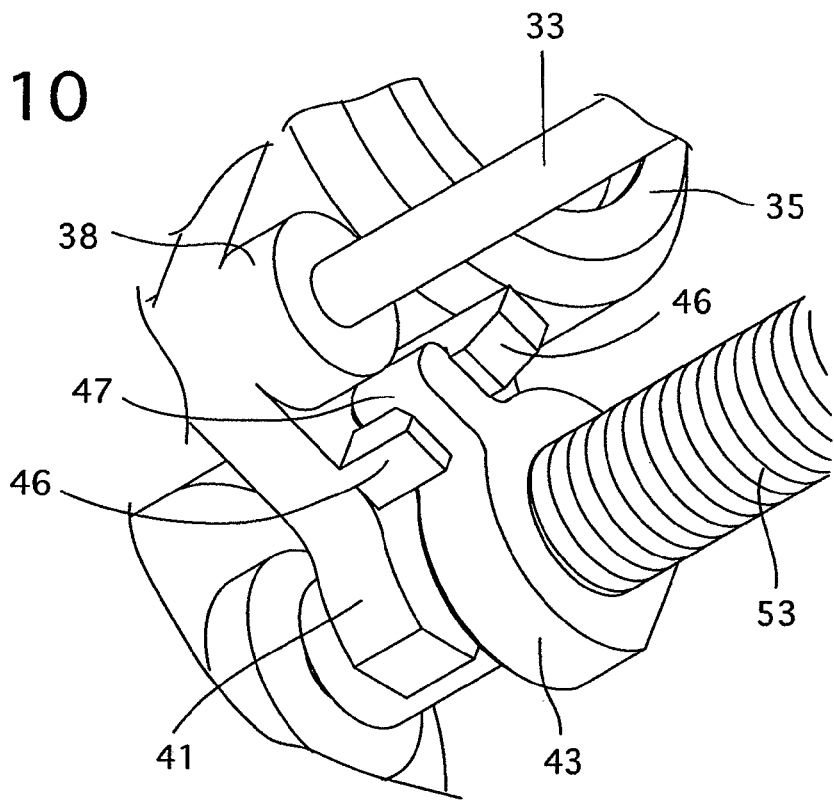
FIG. 10 is an enlarged perspective view of a part of the internal elements shown in FIG. 8 in the vicinity of an engaged portion between the nut-engaging portion of the second lens group frame and the nut on the second motor side.

The first lens group frame 34 is provided with a nut-engaging portion 40 and the second lens group frame 35 is provided with a nut-engaging portion 41. A nut 42 is engaged with the nut-engaging portion 40 and a nut 43 is engaged with the nut-engaging portion 41. As shown in FIG. 9 as an enlarged view, the nut 42 is engaged with the nut-engaging portion 40 with a held projection 45 (which projects radially from the nut 42) being held (snap-fitted) between a pair of holding projections 44 which project from the nut-engaging portion 40 so that the first lens group frame 34 and the nut 42 move together in the X-direction. Likewise, as shown in FIG. 10 as an enlarged view, the nut 43 is engaged with the nut-engaging portion 41 with a held projection 47 (which projects radially from the nut 43) being held (snap-fitted) between a pair of holding projections 46 which project from the nut-engaging portion 41 so that the second lens group frame 35 and the nut 43 move together in the X-direction.

The imaging unit 20 is provided therein with a first motor (actuator) 50 for driving the first lens group LG1 and a second motor (actuator) 52 for driving the second lens group LG2. The nut 42 is provided with a screw hole (through hole) in which a drive shaft (feed screw shaft) 51 of the first motor 50 is screw-engaged, while the nut 43 is provided with a screw hole (through hole) in which a drive shaft (feed screw shaft) 53 of the second motor 52 is screw-engaged. The first motor 50 is supported by the housing 21; more specifically, the first motor 50 is provided with a cylindrical motor body 55, and the housing 21 is provided therein with a motor support portion 54 (see FIG. 6) which is formed on a portion of the housing 21 in the vicinity of the upper wall 23 to support the motor body 55 with the axis thereof extending in the X-direction. The drive shaft 51 of the first motor 50 extends from the motor body 55 of the first motor 50 in a direction to approach the right wall 25. The second motor 52 is also supported by the housing 21; more specifically, the second motor 52 is provided with a cylindrical motor body 57, and the housing 21 is provided therein with a motor support portion 56 (see FIG. 6) which is formed on a portion of the housing 21 in the vicinity of the lower wall 24 to support the motor body 57 with the axis thereof extending in the X-direction. The drive shaft 53 of the second motor 52 extends from the motor body 57 of the second motor 52 in a direction to approach the right wall 25. Accordingly, in addition to the guide bars 32 and 33, the first motor 50 (the drive shaft 51 thereof) and the second motor 52 (the drive shaft 53 thereof) are also arranged so that the lengthwise directions (axial directions) thereof become substantially parallel to the X-direction. In addition, the first motor 50 is positioned in the vicinity of the front opening 22 (at a position closer to the object side than the second motor 52) in the Z-direction, while the second motor 52 is positioned in the back of the housing 21 in the vicinity of the back wall 27 in the Z-direction.

A rotation of the drive shaft 51 of the first motor 50 causes the nut 42 to move in the X-direction due to the screw-engagement of the nut 42 with the feed screw thread on the drive shaft 51, thus causing the first lens group frame 34 to move in the X-direction since the nut 42 is prevented from rotating in a state where the nut 42 is engaged with the nut-engaging portion 40. Likewise, a rotation of the drive shaft 53 of the second motor 52 causes the nut 43 to move in the X-direction due to the screw-engagement of the nut 43 with the feed screw thread on the drive shaft 53, thus causing the second lens group frame 35 to move in the X-direction since the nut 43 is prevented from rotating in a state where the nut 43 is engaged with the nut-engaging portion 41.

As described above, the optical system provided in the imaging unit 20 is a zoom optical system in which the focal length varies by moving the first lens group frame 34 and the second lens group frame 35 (namely, the first lens group LG1 and the second lens group LG2) relative to each other in the X-direction in a predetermined moving manner. Additionally, a focusing operation can be carried out by moving either the first lens group LG1 or the second lens group LG2 in the X-direction. Although it is optional as to which of the first lens group LG1 and the second lens group LG2 is used as a focusing lens group, the second lens group LG2 is used as a focusing lens group in the present embodiment of the imaging unit 20.

Figure 5:
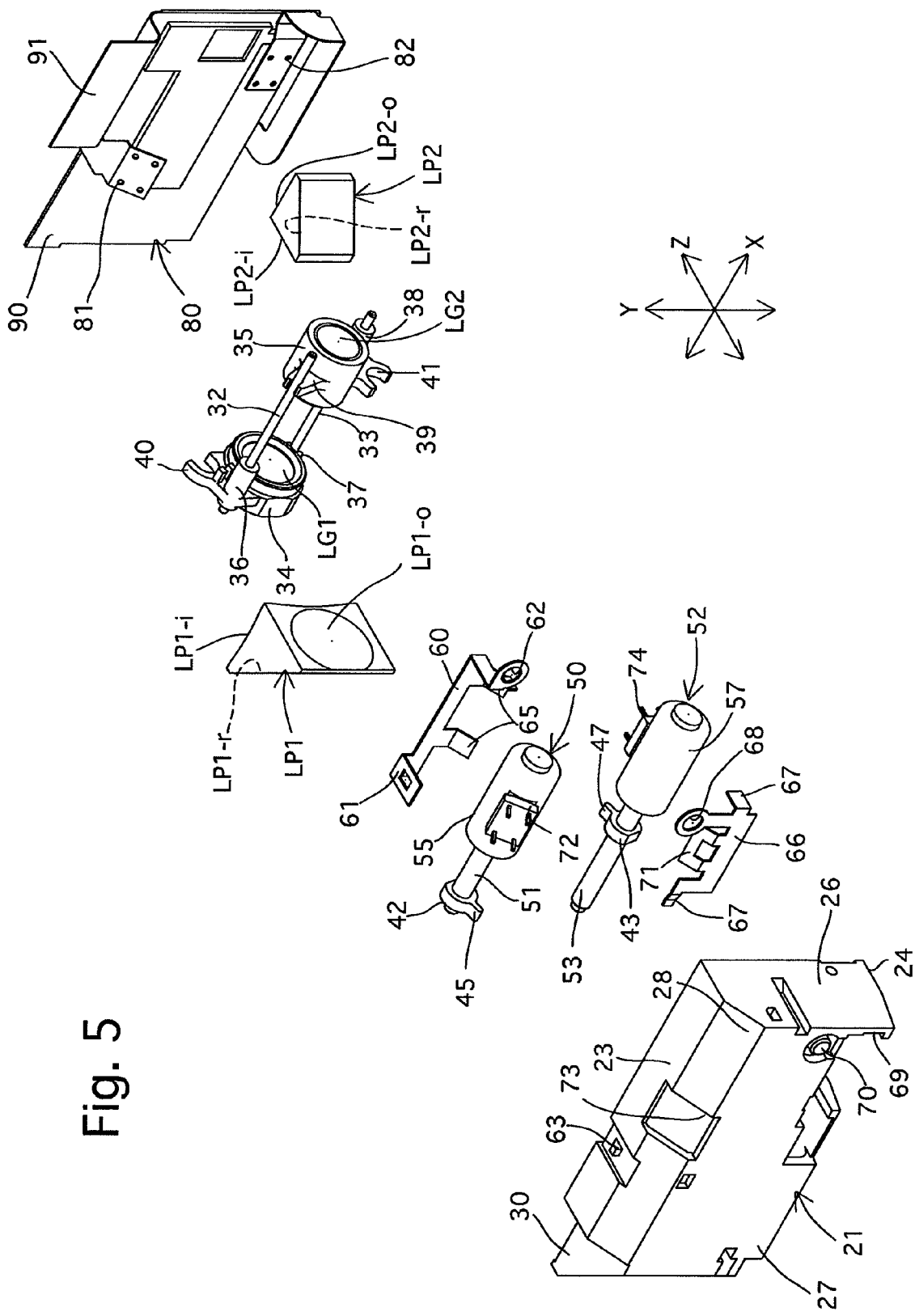
FIG. 5 is an exploded perspective view of the imaging unit.

The first motor 50 is held by a first-motor holding member 60 (see FIG. 5). The first-motor holding member 60 is a plate-like member elongated in the X-direction. The first-motor holding member 60 is provided, at one end and the other end thereof in the X-direction, with a mounting arm 61 and a positioning hole 62, respectively. The mounting arm 61 and the positioning hole 62 are brought to be engaged with a fixing portion (fixing lug) 63 and a positioning pin 64 (see FIG. 6) which project from the housing 21, respectively, to fix the first-motor holding member 60 to the housing 21. In this state where the first-motor holding member 60 is fixed to the housing 21, a holding lug 65 formed at a center of the first-motor holding member 60 is in press contact with the motor body 55 of the first motor 50 to hold the first motor 50. FIG. 6 shows a state where the first-motor holding member 60 is removed from the housing 21. The second motor 52 is held by a second-motor holding member 66 (see FIG. 5). The second-motor holding member 66 is provided, at the opposite ends thereof in the X-direction, with two mounting arms 67, respectively, and is further provided, at a position adjacent to one of the two mounting arms 67, with a positioning hole 68. The first-motor holding member 60 is fixed to the housing 21 from the front opening 22 side, while the second-motor holding member 66 is fixed to the housing 21 from the back wall 27 side. As shown in FIG. 5, a recess/cutout, in which the second-motor holding member 66 is fixedly positioned, is formed in the back wall 27. The housing 21 is provided in the above-mentioned recess thereof with two mounting portions 69 (only one of which appears in FIG. 5) with which the two mounting arms 67 of the second-motor holding member 66 are engaged, and is further provided in the recess with a positioning projection 70 with which the positioning hole 68 is engaged. In a state where the second-motor holding member 66 is fixed to the housing 21 to be positioned inside the recess on the back wall 27 side, a holding lug 71 formed at a center of the second-motor holding member 66 is in press contact with the motor body 57 of the second motor 52 so as to hold the second motor 52.

Motor terminals 72 of the first motor 50 which project from the motor body 55 are exposed to the outside of the housing 21 through a through hole 73 formed in the housing 21. Motor terminals 74 of the second motor 57 which project from the motor body 57 are extend toward the front opening 22.

The imaging unit 20 is completed by fixing a cover board (sensor board) 80 to the housing 21 so as to close the front opening 22 after the above described elements which are to be installed to the housing 21 are installed to the housing 21. As shown in FIG. 12, the cover board 80 is provided with electronic circuit parts such as an image sensor 83, a digital signal processor (hereinafter referred to as DSP) 84, a quartz oscillator 85, a read-only memory (hereinafter referred to as ROM) 86, a random-access memory (hereinafter referred to as RAM) 87 and a motor driver 88, which are all mounted on a substrate 90 in the shape of a flat plate at different positions thereon. Each electronic part (chip) contained on the cover board 80 is fixed to the cover board 80 by connecting a bare chip to the substrate 90 by wire bonding.

Figure 13:
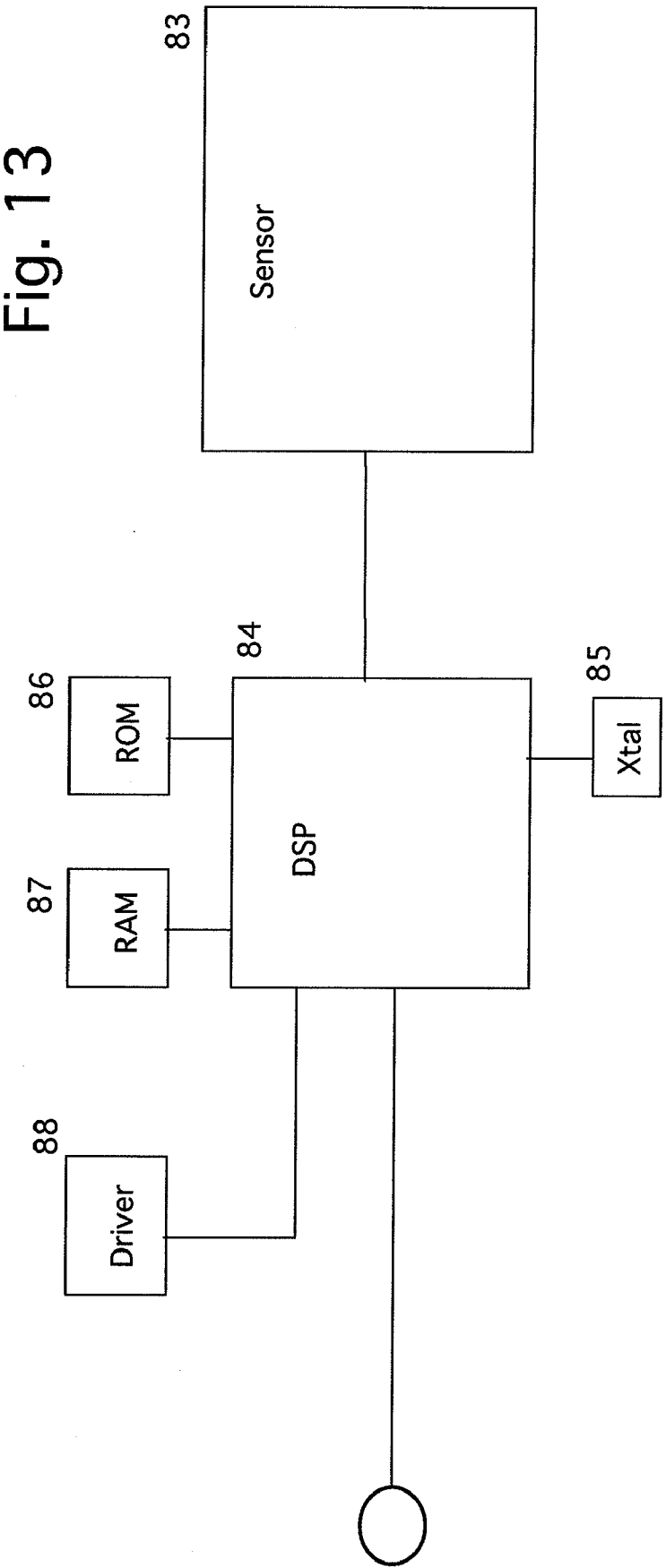
FIG. 13 is a block diagram of the electronic circuit parts contained on the cover board, showing the connection for control between the electronic circuit parts.

FIG. 13 shows the connection for control between electronic circuit parts contained on the cover board 80. The image sensor 83 is a conventional type such as a CCD or CMOS image sensor that converts light incident on the imaging surface (light-receiving surface) thereof into an electrical signal to output this signal. In live view mode in which live images (live preview) are displayed on the liquid crystal display 16, the signal from the image sensor 83 is sequentially read out therefrom by control of the DSP 84 to be processed by the DSP 84 therein in order to be generated as a signal (YUV signal) capable of being visually indicated by display elements of the liquid crystal display 16. When a photograph is taken to capture a still image, all the pixel signals (pixel data) are read out of the image sensor 83 in accordance with a control signal output from the DSP 84 to be processed by the DSP 84 therein, compressed in a predetermined format such as JPEG by the DSP 84 and output from the DSP 84 as an image signal capable of being stored into an external memory (e.g., a removable memory card). The DSP 84 also controls the operations of the first motor 50 and the second motor 52 via the motor driver 88. As described above, the first motor 50 and the second motor 52 are actuated when a zooming operation is performed to change the focal length of the zoom optical system, and the second motor 52 is actuated when a focusing operation is performed. A program for operating the DSP 84 is stored in the ROM 86. Upon startup of the power of the mobile phone 10, the DSP 84 reads in this program from the ROM 86 to perform a series of startup processes, and processes the signal output from the image sensor 83 to output object images (live preview), which visually informs the user that the mobile phone 10 has entered a ready-to-photograph state. The RAM 87 is used as a temporary storage in order for the DSP 84 to process the image signal input from the image sensor 83. The quartz oscillator 85 outputs a timing signal with a preset clock speed.

The cover board 80 is in the shape of a rectangle elongated in the X-direction. The cover board 80 is substantially identical in two-dimensional size to the front opening 22 in the X-direction and the Y-direction. As shown in FIG. 11, upon the cover board 80 being fixed to the housing 21 so as to close the front opening 22, the imaging surface of the image sensor 83 is positioned to face the exit surface LP2-$o$ of the second prism LP2. In other words, the image sensor 83 is positioned on the exit optical axis OP-2. When the cover board 80 is fixed to the housing 21, the fixing position of the cover board 80 relative to the housing 21 is finely adjusted so that an object image formed through the imaging optical system (which includes the first prism LP1, the first lens group LG1, the second lens group LG2 and the second prism LP2) supported by the housing 21 is precisely formed on the imaging surface of the image sensor 83. The cover board 80 is fixed to the housing 21 by a fixing device such as an adhesive.

When the cover board 80 is fixed to the housing 21, a motor connecting board (printed wiring board) 81 which extends from the cover board 80 is connected to the motor terminals 72 of the first motor 50, and also a motor connecting board (printed wiring board) 82 which extends from the cover board 80 is connected to the motor terminals 74 of the second motor 52. The motor connecting boards 81 and 82 are connected to the motor driver 88, so that the operations of the first motor 50 and the second motor 52 can be controlled by the motor driver 88 upon completion of the installation of the cover board 80 to the housing 21.

In the imaging unit 20 in a completed state thereof after the cover board 80 and the housing 21 have been joined to each other, the incident opening 30a, through which the incident surface LP-i of the first prism LP1 is exposed to the outside of the imaging unit 20, is the only opening in the imaging unit 20; namely, the remaining part of the imaging unit 20 is closed up. In other words, in the completed imaging unit 20, the incident opening 30a is the only optical opening in the housing 21 which allows light to enter the imaging unit 20 from the outside of the housing 21, so that no other optical openings allowing light to enter the imaging unit 20 from the outside of the housing 21 are provided in the housing 21. The imaging unit 20 is installed in the display portion 12 of the mobile phone 10 so that the incident surface LP1-i of the first prism LP1 is positioned behind the photographic aperture 14 as shown in FIGS. 1 and 2. In this installation operation, an image-signal flexible PCB (printed-circuit board) 91 which extends from the cover board 80 is connected to a control circuit (not shown) provided in the mobile phone 10.

The control circuit of the mobile phone 10 sends a control signal which is input via an operating device such as the operational keys 15 to the imaging unit 20 via the image-signal flexible PCB 91. That control signal is, e.g., a photographing-operation execution signal, a live-view (image-indication) execution signal, or a zooming operation signal. Upon inputting the photographing-operation execution signal, the imaging unit 20 carries out a photographing operation including the above-described focusing operation (in which the second lens group LG2 is driven by the second motor 52), and the imaging unit 20 sends an image signal which has been processed and formatted by the DSP 84 to be stored in memory to the control circuit via the image-signal flexible PCB 91. Upon inputting the live-view execution signal, the imaging unit 20 sends an image signal (YUV signal) for on-screen indication which has been processed by the DSP 84 to the control circuit via the flexible PCB 91. In addition, immediately after the imaging unit 20 inputs the zooming operation signal, the first motor 50 and the second motor 52 are actuated via the motor driver 88 to change the focal length of the imaging optical system of the imaging unit 20. Additionally, power is also supplied to the imaging unit 20 via the flexible PCB 91.

As described above, an imaging system of the mobile phone 10 is completed by connecting the flexible PCB 91 that extends from the imaging unit 20 to the control circuit of the mobile phone 10. In the manufacturing process of the mobile phone 10, the imaging unit 20, which includes electronic circuit parts on the cover board 80 and is assembled as a module in advance, is simply installed in the display portion 12, and accordingly, no complicated operation for installation of the imaging unit 20 is necessary, hence, the mobile phone 10 is superior in workability of assembly thereof. From a similar point of view, the mobile phone 10 is superior in maintainability when the imaging unit 20 is repaired or replaced. In addition, the load of image processing is not applied to the control circuit of the mobile phone 10 since the image signal having been processed by the DSP 84 is output from the imaging unit 20. Additionally, the mobile phone 10 does not have to be provided therein with any complicated drive mechanism for the imaging system of the mobile phone 10 because a support-and-drive mechanism (which includes a support-and-guide mechanism composed of the guide bars 32 and 33, and actuators such as the first motor 50 and the second motor 52) for moving the first lens group LG1 and the second lens group LG2 is also installed in the imaging unit 20. In other words, since all the elements for a photographing operation are designed in a module in the imaging unit 20, the versatility of the imaging unit 20 is high, so that the imaging unit 20 can be incorporated in various mobile electronic devices.

Additionally, the imaging unit 20 has been made compact in size by providing the elements of the imaging unit 20 as a unit in a space-saving manner, which contributes to miniaturization of the electronic devices installed in the mobile phone 10. The imaging optical system of the imaging unit 20 is designed as a bending optical system in which light incident from the object side through the photographic aperture 14 is bent by the first prism LP1 to travel along the X-direction and subsequently bent by the second prism LP2 to travel back toward the object side to be formed as an image on the imaging surface of the imaging sensor 83. In addition, the first lens group LG1 and the second lens group LG2 are arranged in an optical path between the first prism LP1 and the second prism LP2 in the X-direction, and also the directions of movements of the first lens group LG1 and the second lens group LG2 in a power-varying (zooming) operation or a focusing operation correspond with the X-direction. Accordingly, the size of the internal space of the imaging unit 20 in the Z-direction which is occupied by the imaging optical system of the imaging unit 20 can be within the size (thickness) of the first prism LP1 or the second prism LP2 in the Z-direction, which contributes to a reduction in thickness of the imaging unit 20 in the Z-direction even though the imaging unit 20 includes a zoom optical system.

Additionally, in the imaging unit 20, the cover board 80, which contains electronic circuit parts including the image sensor 83, serves as a cover member for the housing 21 that supports an optical system. Since the imaging surface of the image sensor 83 automatically faces the exit surface LP2-o of the second prism LP2 upon the cover board 80 being fixed onto the housing 21 in place, the image sensor 83 can be installed at an image-forming plane of the optical system of the imaging unit 20 with no need for any complicated support structure. Additionally, in order to close the front opening 22 that is elongated in the X-direction, the cover board 80 can also be formed in an elongated shape in the X-direction, which makes it possible to arrange a plurality of electronic circuit parts (including the image sensor 83 and the DSP 84) dispersively at different positions in the X-direction (partly in the Y-direction). As a result, the space in the Z-direction which is occupied by these electronic circuit parts (or the thickness of these electronic circuit parts in the Z-direction) can be minimized, and accordingly, the imaging unit 20 that contains not only an optical system but also an electrical circuit is successfully slimmed down on the whole in the Z-direction.

Specifically, in the present embodiment of the imaging optical system, as shown in FIG. 11, the first prism LP1 is greater in size in the Z-direction than any other optical element (the second prism LP2, the first lens group LG1 and the second lens group LG2) of the imaging unit 20; namely, the first prism LP1 is provided with a projected portion on which the incident surface LP1-i is formed, the projected portion projecting toward the object side by a slightly greater amount than the other optical elements of the imaging unit 20 in the Z-direction. The cover board 80 lies in an extension of this slightly projected portion of the first prism LP1 in the X-direction. In other words, the cover board 80 lies in a plane in which this slightly projected position of the first prism LP1 substantially lies. In a manner of speaking, the cover board 80 is positioned with the use of the space (dead space) in the Z-direction which is created between the first prism LP1 and the other optical elements. This has achieved a further improvement in space-saving efficiency. In particular, in the case where the imaging optical system is designed to have a wide angle of view, this particular positioning of the cover board 80 is effective since the first prism LP1 tends to be large in size.

In electronic devices having a display device which faces the user, such as the mobile phone 10, space for installation of various parts can be easily obtained because the display device itself occupies a certain area in the two-dimensional directions (X-Y directions). For instance, since the X-direction of the imaging unit 20 corresponds to the width of the liquid crystal display 16, a relatively long optical path length can be easily secured in the X-direction in the display portion 12. On the other hand, in the direction of the thickness of the liquid crystal display 16 (i.e., in the Z-direction), the sizes (thicknesses) of internal elements of the display portion 12 other than the liquid crystal display 16 tend to influence (i.e., increase) the thickness of the display portion 12. Conversely, if an internal component of the display portion 12 such as the imaging unit 20 can be slimmed in the Z-direction, the whole thickness of the mobile phone 10 can be minimized. The above described structure of the imaging unit 20 achieves a reduction in size of the imaging unit 20 in the Z-direction, thus making it possible to contribute to a reduction in thickness of the mobile phone 10.

The imaging unit 20 is disposed in the display portion 12 so that the direction of the length of the imaging unit 20 (i.e., the X-direction) is coincident with the widthwise direction of the display portion 12 (i.e., the direction substantially parallel to the axis Q of the pair of hinge pins 13*a*) and so that the direction of the short-length (height) of the imaging unit 20 (i.e., the Y-direction) is coincident with the direction of the longitudinal direction of the display portion 12 (i.e., a direction substantially orthogonal to the axis Q of the pair of hinge pins 13*a*). In other words, as shown in FIGS. 1 and 2, the imaging unit 20 is positioned in the display portion 12 so that an intermediate optical axis OP-C of the imaging optical system installed in the imaging unit 20 becomes substantially parallel to the axis Q of the pair of hinge pins 13*a*. Since the imaging unit 20 is installed between the hinge portion 13 and the liquid crystal display 16 in the longitudinal direction of the display portion 12, the space for installation of the imaging unit 20 which extends in the said longitudinal direction of the display portion 12 is limited by the dimensions of the liquid crystal display 16. On the other hand, the liquid crystal display 16 does not limit the space for installation of the imaging unit 20 in the widthwise direction of the display portion 12. Therefore, the above described orientation of the imaging unit 20 with respect to the display portion 12 makes it possible to install the imaging unit 20 in the display portion 12 in a space-saving manner without the imaging unit 20 interfering with the liquid crystal display 16. In other words, the liquid crystal display 16 having a wide display area can be adopted.

As described above, the present embodiment of the imaging unit 20 has been successfully made compact in size, and is superior in handling during manufacturing and maintenance, and is suitable for being installed in a portable electronic device such as the mobile phone 10.

Figure 14:
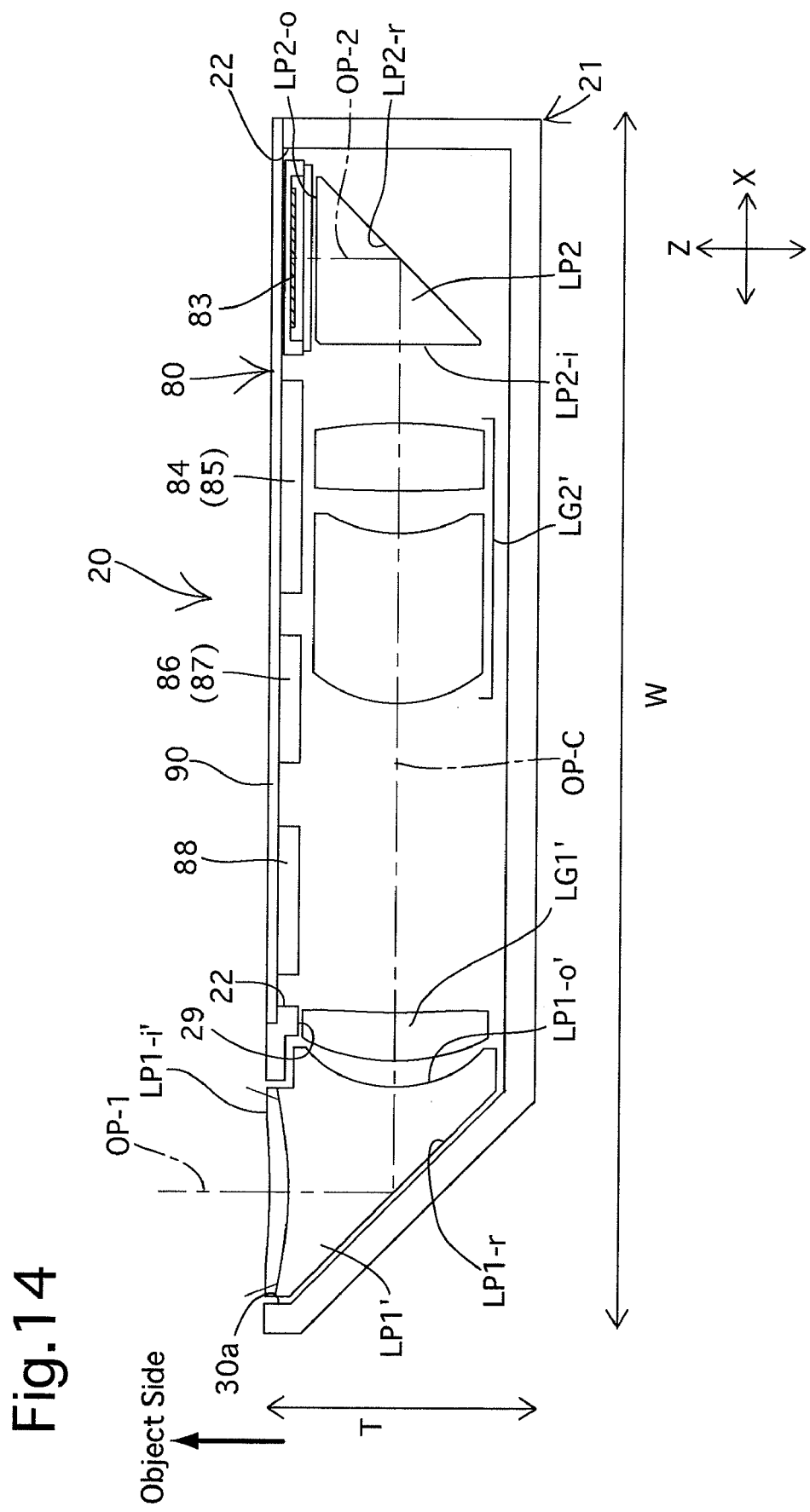
FIG. 14 is a cross sectional view of another embodiment of the imaging unit in which the imaging optical system is different in optical configuration from the imaging optical system shown in FIG. 11.

FIG. 14 shows a modified embodiment of the imaging optical system in the imaging unit 20. This embodiment of the imaging optical system is provided with a first prism LP1', a first lens group LG1', a second lens group LG2' and a second prism LP2' which correspond to the first prism LP1, the first lens group LG1, the second lens group LG2 and the second prism LP2 of the imaging optical system shown in FIG. 11, respectively. In the first prism LP1', the incident surface LP1-*i*' and the exit surface LP1-*o*' are concave surfaces. The first lens group LG1' and the second lens group LG2' both have a positive refracting power.

FIG. 15 shows a modified embodiment of the optical system of FIG. 14, in which an additional front lens group LGF is provided on the incident optical axis OP-1 so as to be positioned in front of (the object side) an incident surface LP1-*i*' of the first prism LP1'. The incident surface of the front lens group LGF is formed as a convex surface and the exit surface thereof is formed as a concave surface. Furthermore, in the housing 21, a lens holding portion 30*b* which holds the front lens group LGF is formed in the in the front portion of the incident opening 30*a* of the first-prism accommodation portion 30. In the imaging optical system shown FIG. 15, the front lens group LGF and the first prism LP1' constitute an incident-side optical element (on the incident optical axis OP-1).

In the imaging optical systems shown FIGS. 14 and 15, the first prism LP1' is greater in size than any other optical element (the second prism LP2', the first lens group LG1' and the second lens group LG2') of the imaging unit 20 in the Z-direction, and the incident surface LP1-*i*' of the first prism LP1' is formed on a projected portion which projects toward the object side by a slightly greater amount than the other optical elements of the imaging unit 20.

Furthermore, in the embodiment shown in FIG. 15, the front lens group LGF is provided in the front portion of the first prism LP1' and takes up a relatively large space in the Z-direction from the other optical elements provided in the imaging unit 20. The cover board 80 lies in an extension of this slightly projected portion of the first prism LP1' (and the front lens group LGF) in the X-direction. More precisely, in the embodiment shown in FIG. 15, the substrate 90 of the cover board 80 lies in an extension of the front lens group LGF in the X-direction, while electronic circuit parts (i.e., the DSP 84, the quartz oscillator 85, the ROM 86, the RAM 87 and the motor driver 88) on the substrate 90 lie in an extension of the projected portion of the first prism LP1' in the X-direction. In other words, the cover board 80 lies in a plane in which the slightly projected portion of the front lens group LGF lies. This has achieved an improvement in space-saving efficiency. Due to the incident-side optical elements (LP1', LGF) on the incident optical axis OP-1 taking up a relatively large space in the Z-direction from the other optical elements provided in the imaging unit 20, electronic circuit parts larger than the electronic circuit parts (i.e., the image sensor 83, the DSP 84, the quartz oscillator 85, the ROM 86, the RAM 87 and the motor driver 88) of the embodiment in FIG. 14 can be provided with the cover board 80 still lying in the above-mentioned plane which includes the front lens group LGF.

In the above described embodiments, as shown in FIGS. 11, 14 and 15, the electronic circuit parts (which include, e.g., the DSP 84) on the cover board 80 except the image sensor 83 are mounted to the surface of the cover board 80 on which the image sensor 83 is mounted, i.e., to the inner surface of the cover board 80 that faces inside the housing 21 when the cover board 80 is fixed to the housing 21. This structure enhances the utilization of the internal space of the housing 21, thus making it possible to achieve further miniaturization of the imaging unit 20. Moreover, this structure is effective in terms of protection of the electronic circuit parts on the cover board 80 from damage and protection from dust.

However, in an imaging unit 120 as shown in FIG. 16, it is possible for the electronic circuit parts contained on a cover board 180 other than an image sensor 183, i.e., a DSP 184, a quartz oscillator 185, a ROM 186, a RAM 187 and a motor driver 188 (which correspond to those shown in FIG. 11, respectively) be disposed on the outer surface (surface facing toward the object side) of a substrate 190 (which corresponds to the substrate 90 shown in FIG. 11), which is on the opposite surface of the substrate 190 from the imaging sensor 183 side. The imaging unit 120 except the cover board 180 is identical in structure to the first embodiment of the imaging unit 20 shown in FIG. 11, and elements of the imaging unit 120 which are identical to those of the imaging unit 20 are designated by the same reference numerals. In the imaging unit 120, the cover board 180 serves as a cover member for closing (covering) the front opening 22 of the housing 21. Electronic circuit parts such as the DSP 184 which are supported by the outer surface of the cover board 180 thereon do not project further toward the object side from the incident surface LP1-$i$, thus not hindering miniaturization of the imaging unit 120 in the Z-direction.

Additionally, according to the present invention, the imaging unit installed in the display portion 12 can be constructed like an imaging unit 220 shown in FIG. 17 or an imaging unit 320 shown in FIG. 18. Unlike the imaging unit 20 shown in FIGS. 11, 14 and 15, and the imaging unit 120 shown in FIG. 16, the imaging unit 220 shown in FIG. 17 is constructed so that the light which is incident on an incident surface LP2-$i$' of a second prism LP2' along the intermediate optical axis OP-C is reflected rearward, toward the back of the imaging unit 320 (i.e., reflected toward the side opposite to the object side), to exit from the imaging unit 220 along an exit optical axis OP-2' which is identical in direction to the incident optical axis OP-1. In a housing 221 of the imaging unit 220 which supports optical elements including the second prism LP2', a portion of the housing 221 which corresponds to the front opening 22 of the housing 21 shown in FIGS. 11, 14, 15 and 16 is closed, while a rear opening 227 is formed in a portion of the back wall of the housing 221 which faces the exit surface LP2-$o$' of the second prism LP2'. The rear opening 227 is formed to extend from the exit portion located on an extension of the exit optical axis OP-2' (from which the light reflected by a reflection surface LP2-$r$' of the second prism LP2' exits the housing 221) to an area along side (parallel to) the intermediate optical axis OP-C in the X-direction, and the rear opening 227 is covered by a cover board 280 which contains the image sensor 283 thereon. The cover board 280 is provided with electronic circuit parts such as an image sensor 283, a DSP 284, a quartz oscillator 285, a ROM 286, a RAM 287 and a motor driver 288 which are all mounted on the same side of a substrate 290 at different positions thereon. In a state where the cover board 280 is fixed to the housing 221, the image sensor 283 is positioned so that the image sensor 283 faces the exit surface LP2-$o$' of the second prism LP2' and so that the DSP 284, the quartz oscillator 285, the ROM 286, the RAM 287 and the motor driver 288 that are mounted on the same side of the substrate 290, are accommodated in the space in the housing 221 which extends along side (parallel to) the intermediate optical axis OP-C.

FIG. 18 shows another embodiment of the imaging unit installed in the display portion 12 of the mobile phone 10. The imaging optical system included in the imaging unit 320 shown in FIG. 18 is identical in optical configuration to the imaging optical system included in the imaging unit 220 shown in FIG. 17, and the imaging unit 320 is different from the imaging unit 220 solely in that an image sensor 383 and other electronic circuit parts (a DSP 384, a quartz oscillator 385, a ROM 386, a RAM 387 and a motor driver 388) contained on a cover board 380 are mounted on both sides of the substrate 390 of the imaging unit 320, not on the same side of the substrate 390, rather than being mounted on the same side of the substrate 290 in the imaging unit 220 shown in FIG. 17. Namely, when the cover board 380 is fixed to the housing 221, the image sensor 383 is positioned to face the exit surface LP2-$o$' of the second prism LP2', similar to the image sensor 283 shown in FIG. 17. However, the DSP 384, the quartz oscillator 385, the ROM 386, the RAM 387 and the motor driver 388 are positioned on the back of the imaging unit 320 to be exposed outside thereof.

Even in the configurations of the imaging units 220 and 320 described above, the imaging units 220 and 320 are common to the imaging unit 20 shown in FIGS. 11, 14 and 15 and the imaging unit 120 shown in FIG. 16 in that the cover board (80, 18, 280 or 380) that contains the image sensor (83, 183, 283 or 383) serves as a cover member for the housing (21 or 221), and accordingly, the imaging units 220 and 320 can also obtain the same effects as the above described effects obtained in the imaging unit 20 shown in FIGS. 11, 14 and 15.

Although the present invention has been discussed with reference to the above described embodiments and the accompanied drawings, the present invention is not limited solely to these particular embodiments; making various modifications to the imaging unit is possible without departing from the spirit or essential character thereof.

For instance, the imaging unit according to the present invention can be incorporated in not only mobile phones but also any other types of mobile devices such as digital cameras (still-video cameras), digital camcorders (motion-video cameras), personal digital assistants (PDAs), personal computers and mobile computers. Additionally, the present invention is not limited to a type of imaging unit which uses a zoom optical system though each of the above illustrated embodiments of the imaging units uses a zoom optical system including two movable lens groups disposed between two prisms.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging unit including an incident optical axis, an intermediate optical axis, and a reflecting surface, wherein light incident on said incident optical axis is deflected by said reflecting surface and is directed along said intermediate optical axis, and wherein a first lens group and a second lens group are disposed along said intermediate optical axis, said imaging unit comprising:

a first guide bar configured to guide a first lens group frame holding said first lens group;

a second guide bar configured to guide a second lens group frame holding said second lens group;

a first actuator having a first drive shaft and configured to move said first lens group frame along said first guide bar; and a second actuator having a second drive shaft and configured to move said second lens group frame along said second guide bar;

wherein said first guide bar and said second guide bar extend in a direction parallel to said intermediate optical axis, and are positioned on opposite sides of said intermediate optical axis when said first guide bar and said second guide bar are viewed from said incident optical axis, and wherein said first drive shaft and said second drive shaft extend in a direction parallel to said intermediate optical axis, and are positioned outside said first and second guide bars such that said first and second guide bars are positioned between said first and second drive shafts when said first and second drive shafts are viewed from a direction perpendicular to said intermediate optical axis.

2. The imaging unit according to claim 1, further including a housing which supports said first and second guide bars, said first and second lens group frames and said first and second actuators, said housing including:

a first base wall and a second base wall provided at upper and lower ends of an opening of said housing, respectively, said first base wall and said second base wall being flat plates that are parallel to each other;

a first side wall and a second side wall provided at side ends of said opening, said first side wall and said second side wall being flat plates that are parallel to each other; and a back wall provided opposite said opening, said back wall being a flat panel that closes a back side of said housing.

3. The imaging unit according to claim 2, wherein said first and second guide bars and the first and second actuators are disposed in said housing between said first and second base walls and said first and second side walls, said first guide bar and said first actuator being disposed closer to said first base wall and said opening of said housing than said second guide bar and said second actuator, and said second guide bar and said second actuator being disposed closer to said second base wall and said back wall of said housing than said first guide bar and said first actuator.

4. The imaging unit according to claim 2, further including a cover board, on which an image sensor is mounted, fixed to said housing so that said image sensor faces said back wall of said housing, said cover board serving as a cover for closing said opening of said housing and extends parallel to said intermediate optical axis.

5. The imaging unit according to claim 1, wherein said imaging unit is incorporated in a mobile electronic device, and wherein a flexible printed circuit board for signal transmission which extends from said imaging unit is connected to a control circuit provided in said mobile electronic device, to thereby comprise an imaging system of said mobile electronic device.

6. The imaging unit according to claim 1, wherein said first drive shaft and said second drive shaft are positioned on opposite sides of said intermediate optical axis when said first and second drive shafts are viewed from the direction perpendicular to the intermediate optical axis.

* * * * *